(12) United States Patent
Nemoto et al.

(10) Patent No.: US 7,509,331 B2
(45) Date of Patent: Mar. 24, 2009

(54) METHOD AND APPARATUS FOR MANAGING FAULTS IN STORAGE SYSTEM HAVING JOB MANAGEMENT FUNCTION

(75) Inventors: Naokazu Nemoto, Kawasaki (JP); Kazuhiko Mogi, Yokohama (JP); Norifumi Nishikawa, Machida (JP); Nobuo Kawamura, Atsugi (JP)

(73) Assignee: Hitachi, Ltd., Tokyo (JP)

( * ) Notice: Subject to any disclaimer, the term of this patent is extended or adjusted under 35 U.S.C. 154(b) by 498 days.

(21) Appl. No.: 11/247,160

(22) Filed: Oct. 12, 2005

(65) Prior Publication Data

US 2006/0036899 A1     Feb. 16, 2006

Related U.S. Application Data

(62) Division of application No. 10/649,665, filed on Aug. 28, 2003, now Pat. No. 7,124,139.

(30) Foreign Application Priority Data

Mar. 28, 2003     (JP)     ............................. 2003-090518

(51) Int. Cl.
*G06F 17/00* (2006.01)
(52) U.S. Cl. .................. 707/101; 707/100; 707/102
(58) Field of Classification Search ......... 707/100–102; 711/6, 114
See application file for complete search history.

(56) References Cited

U.S. PATENT DOCUMENTS

| | | | |
|---|---|---|---|
| 5,500,940 A | 3/1996 | Skeie | |
| 6,035,306 A | 3/2000 | Lowenthal et al. | |
| 6,130,875 A | 10/2000 | Doshi et al. | |
| 6,636,981 B1 | 10/2003 | Barnett et al. | |
| 6,757,778 B1 * | 6/2004 | van Rietschote | 711/6 |
| 6,766,430 B2 | 7/2004 | Arakawa et al. | |
| 6,898,670 B2 * | 5/2005 | Nahum | 711/114 |
| 2002/0196744 A1 | 12/2002 | O'Connor | |
| 2003/0172153 A1 | 9/2003 | Vaver | |
| 2003/0229645 A1 | 12/2003 | Mogi et al. | |

(Continued)

FOREIGN PATENT DOCUMENTS

JP     07-152498     6/1995

(Continued)

*Primary Examiner*—Sana Al-Hashemi
(74) *Attorney, Agent, or Firm*—Mattingly, Stanger, Malur & Brundidge, PC

(57) ABSTRACT

A computer system identifies jobs affected by a fault which occurs in any device or mechanism in a storage system to control the execution of such jobs. The computer system includes a DBMS server device, a virtualization switch device, and storage device. Each of these devices holds part of data mapping information on a data mapping path from a particular DB table accessed by a job, through a logical volume for storing the table, to physical disk units for distributively storing data on the volume. The management server device acquires the part of data mapping information from each device, and integrates the data mapping information on a job-by-job basis. When any device or mechanism fails on the data mapping path, the management server device identifies jobs affected by the fault with reference to the data mapping information. The management server device also controls the execution of these jobs.

7 Claims, 21 Drawing Sheets

U.S. PATENT DOCUMENTS

| | | |
|---|---|---|
| 2003/0236945 A1* | 12/2003 | Nahum ....................... 711/114 |
| 2004/0034751 A1* | 2/2004 | Horn et al. .................. 711/158 |
| 2004/0049572 A1 | 3/2004 | Yamamoto et al. |
| 2004/0064543 A1 | 4/2004 | Ashutosh et al. |
| 2004/0103210 A1 | 5/2004 | Fujii et al. |
| 2004/0153844 A1 | 8/2004 | Ghose et al. |

FOREIGN PATENT DOCUMENTS

| | | |
|---|---|---|
| JP | 10-340185 | 12/1998 |
| JP | 2001-142648 | 5/2001 |
| JP | 2001-337790 | 12/2001 |
| JP | 2002-82775 | 3/2002 |

* cited by examiner

| DB-IF | NAME |
|-------|------|
| R1    | DB1  |

3012 DBMS SERVER I/F TABLE

| DBMS-ID | JOB ID | TABLE NAME | FILE NAME | REAL VOLUME NAME | DB-IF | SCSI-ID | LUN |
|---------|--------|------------|-----------|------------------|-------|---------|-----|
| DBMS1 | Job1 | TABLE 1 | File1 | Vol1 | R1 | 1 | 1 |
| DBMS1 | Job1 | TABLE 1 | File1 | Vol1 | R1 | 2 | 1 |
| DBMS1 | Job1 | TABLE 1 | File1 | Vol2 | R1 | 1 | 1 |
| DBMS1 | Job2 | TABLE 1 | File2 | Vol3 | R1 | 1 | 1 |
| DBMS1 | Job2 | TABLE 1 | File2 | Vol3 | R1 | 2 | 1 |

3011 DBMS SERVER MANAGEMENT TABLE

FIG.9

| DATA I/F-ID | VIRTUAL DATA I/F ID | SCSI-ID |
|---|---|---|
| S1 | LSWIF1 | 1 |
| S1 | LSWIF1 | 2 |
| S2 | LSWIF2 | 1 |
| S3 | LSWIF3 | 1 |
| S3 | LSWIF3 | 2 |

4013  SWITCH I/F TABLE

FIG.10

| DATA I/F | SWITCH SIDE NAME | DESTINATION NAME |
|---|---|---|
| S1 | Switch1 | DB1 |
| S2 | Switch2 | DB1 |
| S3 | Switch3 | DB1 |
| S4 | Switch4 | STRAGE1 |
| S5 | Switch5 | STRAGE1 |
| S6 | Switch6 | STRAGE2 |

4012  FC CONNECTION MANAGEMENT TABLE

FIG.11

4014 SWITCH MANAGEMENT TABLE

| VIRTUAL DATA I/F ID (11110) | VIRTUAL VOLUME — SCSI-ID (11120) | VIRTUAL VOLUME — LUN (11100/11130) | VIRTUAL VOLUME ID (11140) | REAL DATA I/F ID (11210) | LOGICAL DISK — SCSI-ID (11200/11220) | LOGICAL DISK — LUN (11230) |
|---|---|---|---|---|---|---|
| LSWIF1 | 1 | 1 | VV11 | S4 | 1 | 1 |
| LSWIF1 | 1 | 1 | VV11 | S4 | 1 | 2 |
| LSWIF1 | 2 | 1 | VV12 | S4 | 2 | 1 |
| LSWIF1 | 2 | 1 | VV12 | S4 | 2 | 2 |
| LSWIF2 | 1 | 1 | VV21 | S5 | 3 | 1 |
| LSWIF2 | 1 | 1 | VV21 | S5 | 3 | 2 |
| LSWIF3 | 1 | 1 | VV31 | S6 | 1 | 1 |
| LSWIF3 | 1 | 1 | VV31 | S6 | 1 | 2 |
| LSWIF3 | 2 | 1 | VV32 | S6 | 2 | 1 |
| LSWIF3 | 2 | 1 | VV32 | S6 | 2 | 2 |

FIG.12

5011 STORAGE DEVICE I/F TABLE

| DATA I/F ID (12010) | STORAGE SIDE NAME (12020) | VIRTUAL DATA I/F ID (12030) | SCSI-ID (12040) |
|---|---|---|---|
| T1 | STRAGE1 | LSTIF1 | 1 |
| T1 | STRAGE1 | LSTIF2 | 2 |
| T1 | STRAGE1 | LSTIF3 | 3 |
| T2 | STRAGE2 | LSTIF4 | 1 |
| T2 | STRAGE2 | LSTIF5 | 2 |

FIG.13

5012 STORAGE DEVICE MANAGEMENT TABLE

| | LOGICAL DISK | | | PHYSICAL DISK | | |
|---|---|---|---|---|---|---|
| VIRTUAL DATA I/F ID | SCSI-ID | LUN | LOGICAL DISK ID | PHYSICAL DISK ID | SCSI-ID | SCSI LUN |
| LSTIF1 | 1 | 1 | STVV11 | SS1 | 1 | 1 |
| LSTIF1 | 1 | 2 | STVV11 | SS2 | 2 | 2 |
| LSTIF2 | 2 | 1 | STVV22 | SS4 | 3 | 3 |
| LSTIF2 | 2 | 2 | STVV22 | SS5 | 4 | 4 |
| LSTIF3 | 3 | 1 | STVV33 | SS6 | 5 | 5 |
| LSTIF3 | 3 | 2 | STVV33 | SS7 | 6 | 6 |
| LSTIF4 | 1 | 1 | STVV44 | SS8 | 7 | 7 |
| LSTIF4 | 1 | 2 | STVV44 | SS9 | 8 | 8 |
| LSTIF5 | 2 | 1 | STVV55 | SS10 | 9 | 9 |
| LSTIF5 | 2 | 2 | STVV55 | SS11 | 10 | 10 |

FIG.15

2012 EVENT DICTIONARY

| FAULT CODE | FAILED/RECOVERED LOCATION | IDENTIFIER | FAULT MANAGEMENT ID |
|---|---|---|---|
| 00a1 | REAL VOLUME RECOVERED | SS1 | F3031 |
| 00a2 | REAL VOLUME RECOVERED | SS2 | F3032 |
| ... | ... | ... | ... |
| 30c1 | REAL VOLUME FAILED | SS1 | F3031 |
| 30c2 | REAL VOLUME FAILED | SS2 | F3032 |
| ... | ... | ... | ... |

FIG. 14

2011 MANAGEMENT SERVER MANAGEMENT TABLE 14100

| DBMS SERVER | | | | | | SWITCH | | | | STORAGE DEVICE REAL VOLUME | | | STORAGE DEVICE | | | | | |
|---|---|---|---|---|---|---|---|---|---|---|---|---|---|---|---|---|---|---|
| | | | | | | VIRTUAL VOLUME | | | | | | | | LOGICAL DISK | | | PHYSICAL DISK | |
| DBMS-ID | JOB ID | TABLE NAME | FILE NAME | VOLUME MANAGER | DB I/F | SWITCH I/F | VIRTUAL VOLUME ID | VIRTUAL DATA I/F ID | SCSI-ID | SCSI-LUN | REAL DATA I/F ID | SCSI-ID | SCSI-LUN | DATA I/F ID | VIRTUAL DATA I/F ID | SCSI-ID | SCSI-LUN | LOGICAL DISK ID | PHYSICAL DISK ID | SCSI-ID | SCSI-LUN |
| DBMS1 | Job1 | TABLE1 | File1 | Vol1 | R1 | S1 | VV11 | LSWIF1 | 001 | 001 | S4 | LSTIF1 | 001 | T1 | LSTIF1 | 001 | 001 | STVV11 | SS1 | 001 | 001 |
| DBMS1 | Job1 | TABLE1 | File1 | Vol1 | R1 | S1 | VV11 | LSWIF1 | 001 | 002 | S4 | LSTIF1 | 002 | T1 | LSTIF1 | 002 | 001 | STVV11 | SS2 | 002 | 002 |
| DBMS1 | Job1 | TABLE1 | File1 | Vol1 | R1 | S1 | VV12 | LSWIF1 | 002 | 001 | S4 | LSTIF2 | 001 | T1 | LSTIF2 | 001 | 001 | STVV22 | SS4 | 003 | 003 |
| DBMS1 | Job1 | TABLE1 | File1 | Vol1 | R1 | S1 | VV12 | LSWIF1 | 002 | 002 | S4 | LSTIF2 | 002 | T1 | LSTIF2 | 002 | 001 | STVV22 | SS5 | 004 | 004 |
| ... | ... | ... | ... | ... | ... | ... | ... | ... | ... | ... | ... | ... | ... | ... | ... | ... | ... | ... | ... | ... | ... |

FIG.24

24000 JOB EXECUTION CONTROL TABLE

| DBMS-ID | JOB ID | EXECUTION ASSIGNED DEVICE | PRIORITY | PROCESSING METHOD | PROCESSING CONTENTS | CONFIRMATION OF PROCESSING | AUTOMATIC EXECUTION |
|---|---|---|---|---|---|---|---|
| DBMS 1 | Job1 | DBMS | 1 | CONSISTENT | CLOSE | NECESSARY | -- |
| DBMS 1 | Job2 | DBMS | 2 | VARIABLE | PAUSE | NOT NECESSARY | YES |
| ... | ... | ... | ... | ... | ... | ... | ... |

24010  24020  24030  24040  24050  24060  24070  24080

24101, 24102

METHOD AND APPARATUS FOR MANAGING FAULTS IN STORAGE SYSTEM HAVING JOB MANAGEMENT FUNCTION

This is a divisional application of U.S. Ser. No. 10/649,665, filed Aug. 28, 2003, now U.S. Pat. No. 7,124,139.

BACKGROUND OF THE INVENTION

The present invention relates to a storage system for use in a computer system, and more particularly to techniques for managing faults in the storage system.

(1) Re: SAN (Storage Area Network)

In recent years, SAN has been increasingly pervasive. The SAN is a network which integrates storages, separated from server computers, into a storage system exclusively for storing data and delivering data stored therein, for use by the server computers from which the storages have been removed. The introduction of the SAN has contributed to the realization of high speed data transfers, high expendability and availability of storage systems, and effective utilization of storage resources.

(2) Re: SAN Manager

For operating storage devices integrated in SAN without interruption, it is necessary to employ a human manager familiar with particular types of storage devices in their respective operations, causing a higher management cost. In the management of operations of storage devices, it is critical to monitor respective devices (server devices, virtualization switch devices, storage devices, and the like) connected to the SAN for their operating situations which are the basis for their daily operations. A software application for monitoring such operating situations will be hereinafter called the "manager program." The manager program has two main functions: a configuration management function and a fault monitoring function for a storage system. With the configuration management function, the manager program periodically acquires information from management agents which reside in respective devices that form part of the SAN, detects a physical connection relationship (topology) of the SAN from the acquired information, and visualizes at all times the most recent topology which is provided to the human manager. With the fault monitoring function, the manager program detects events such as faults, degraded performance, and the like based on event notices issued by respective devices for notifying hardware faults, degraded performance, and the like, as well as on device information periodically acquired from the management agents resident in the respective devices, and notifies the human manager of the detected events. These two functions permit the user to uniformly manage the operating situations of particular devices using the manager program, and to reduce the operation cost through cutbacks of human managers.

(3) Re: Mapping Technique between Databases and Storages:

U.S. Pat. No. 6,035,306 discloses a technique for analyzing the performance using a mapping technique between databases and storages. The mapping technique can be introduced into the SAN to analyze the performance of the databases or files on a one-by-one basis.

A database management system (hereinafter called the "DBMS") employs a storage device capable of storing a large amount of data for building a database therein. The DBMS processing is required to ensure a high throughput and high reliability. By using a storage device for storing a database, high speed and reliable processing can be continuously executed. The DBMS called by a job unintentionally uses a plurality of physical disk units in the storage device. A virtualizer provides a plurality of logical disks as a single virtual volume. It is difficult for the DBMS to dominate the configuration of the storage devices including the virtualizer having a virtualization function, using the mapping technique, for managing the storage devices. Also, when a fault occurs in the storage system including the virtualizer, it is impossible to identify a particular job that is affected by the fault only with information on the fault about devices associated therewith. In the event of such a fault, a manual investigation is required. In addition, the human's intervention is also required for controlling the execution of a job affected by a fault, thereby resulting in a higher cost.

SUMMARY OF THE INVENTION

It is an object of the present invention to provide techniques for identifying jobs affected by a fault that can occur anywhere in a storage system to control the execution of these jobs.

The present invention is characterized by a fault management technique for identifying a job affected by a fault at any location existing on a data mapping path which includes a particular table on a database accessed by a particular job, a file for storing the table, a logical volume for storing the file, and physical disk units for distributively storing data on the volume, based on data mapping information related to the data mapping path.

The present invention is also characterized by a technique for processing a job identified to be affected by a fault in accordance with a processing method which is previously set in a job execution table.

Other objects, features and advantages of the invention will become apparent from the following description of the embodiments of the invention taken in conjunction with the accompanying drawings.

BRIEF DESCRIPTION OF THE DRAWINGS

FIG. 9 shows an example of an I/F table held by the virtualization switch device;

FIG. 10 shows an example of an FC connection management table held by the virtualization switch device;

FIG. 11 shows an example of a switch management table held by the virtualization switch device;

FIG. 12 shows an example of an I/F table held by the storage device;

FIG. 13 shows an example of a storage device management table held by the storage device;

FIG. 14 shows an example of a management server management table held by the management server device;

FIG. 15 is a table showing exemplary interpretations in an event dictionary held by the management server device;

FIG. 24 shows an example of the job execution control table held by the management server device;

DETAILED DESCRIPTION OF THE EMBODIMENTS

In the following, several embodiments of the present invention will be described with reference to the accompanying drawings. It should be understood, however, that the present invention is not limited to such embodiments.

(1) First Embodiment

Management of Configuration of Volume Mapping among Devices, and Fault Monitoring In a computer system according to a first embodiment, a management server device is connected to a virtualization switch device, a DBMS server device, and a storage device through a dedicated management network. Each of the DBMS server device, virtualization switch device and storage device comprises a management agent. The management server device collects data mapping information from the respective management agents, and manages the configuration of the data mapping on a job-by-job basis. The management server device uses a fault notice message defined in SNMP (Simple Network Management Protocol) to notify the human manager of jobs affected by a fault, from a message received from a failed device and the data mapping information.

An exemplary configuration of SAN will be first described with reference to FIGS. 1 to 16. FIGS. 1 to 5 illustrates exemplary configurations of the SAN and devices connected to the SAN. FIG. 6 illustrates a hierarchical structure of data mapping. FIGS. 7 to 16 show management information provided in the DBMS server device, virtualization switch device, and storage device.

Figure 1:
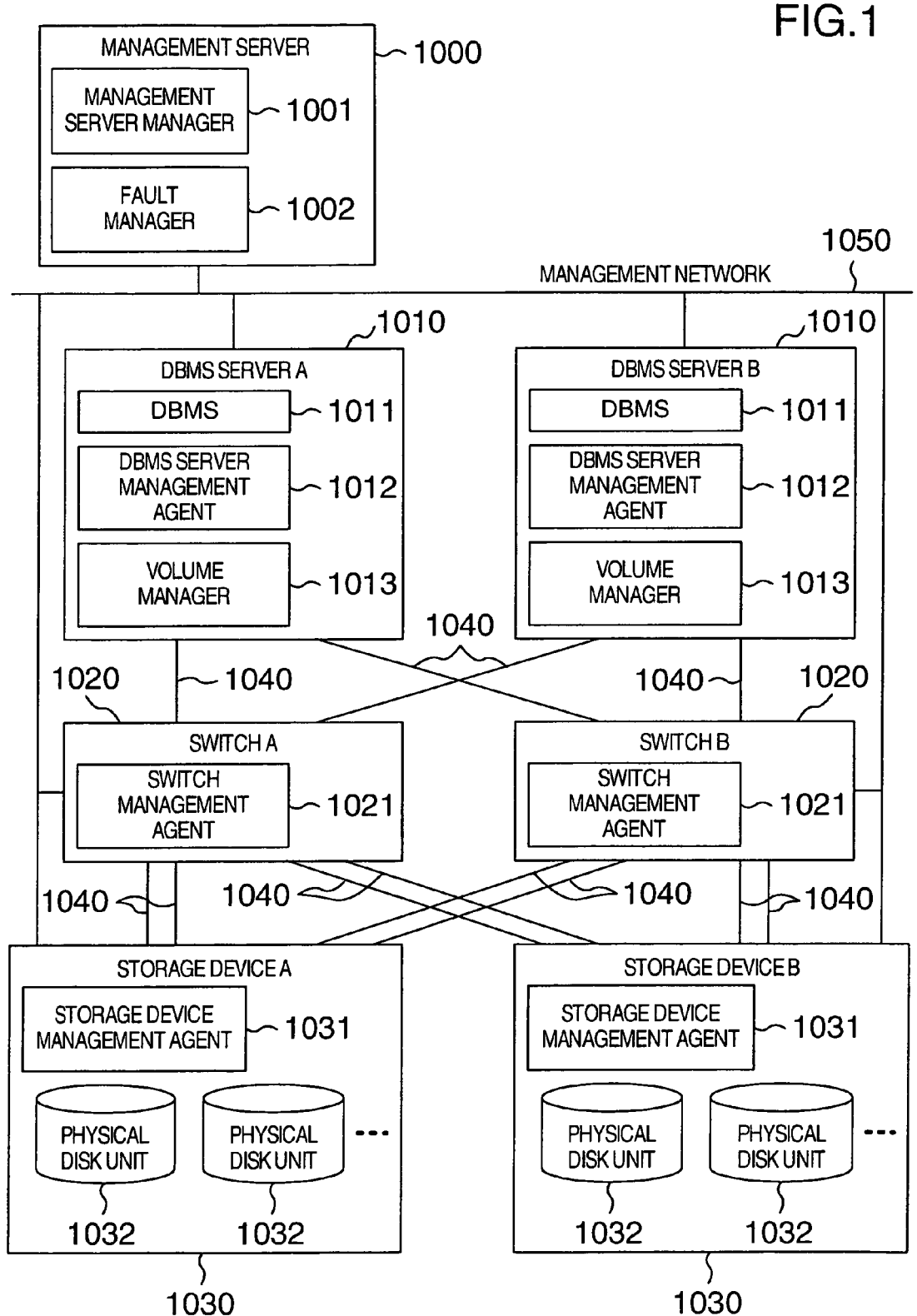
FIG. 1 is a block diagram illustrating an exemplary configuration of a computer system which includes a storage system.

FIG. 1 illustrates an exemplary configuration of the computer system according to the first embodiment. The illustrated computer system comprises DBMS server devices 1010, virtualization switch devices 1020, storage devices 1030, and a management server device 1000. Each of the DBMS server devices 1010 (hereinafter called the "DBMS server") comprises a DBMS 1011, a DBMS server management agent 1012, and a volume manager 1013. Each of the virtualization switch devices 1020 (hereinafter simply called the "switch") comprises a switch management agent 1021. Each of the one or more storage devices 1030 comprises a storage device management agent 1031. The single management server device 1000 (hereinafter simply called the "management server") comprises a management server manager 1001 and a fault manager 1002. Additionally, the computer system may comprise an application server or a client terminal which is connected to the management network 1050 to utilize the DBMS server 1010, in addition to the DBMS servers 1010. Alternatively, the DBMS server 1010 itself may be called the application server. The computer system illustrated in FIG. 1 shows two each of the DBMS servers 1010, switches 1020, and storage devices 1030. The following description, however, will be made on the assumption that one DBMS server 1010, one switch 1020, and one storage device 1030 are interconnected through a fiber channel 1040 (hereinafter abbreviated as "FC"), for the sake of convenience.

The DBMS server 1010 comprises a DBMS 1011 which uses the storage device 1030 for building a database therein; a volume manager 1013 for managing volumes; and a DBMS server management agent 1012 for managing the configuration of volumes in the DBMS server 1010. The switch 1020 comprises a switch management agent 1021 for managing the configuration of virtual volumes in the switch 1020 itself. The storage device 1030 comprises a storage device management agent 1031 for managing the configuration between the virtual volumes of the switch 1020 and physical disks 1032 of the storage device 1030.

The management server 1000 is connected to the DBMS server 1010, switch 1020, and storage device 1030 through the management network 1050. The management server manager 1001 of the management server 1000 can communicate with the DBMS server management agent 1012, switch management agent 1021, and storage device management agent 1031 through the management network 1050.

The management server manager 1001 acquires mapping information on the respective devices from the DBMS server management agent 1012, switch management agent 1021, and storage device management agent 1031, and manages the configuration of virtual volumes, real volumes, logical disks, and physical disks in the SAN through uniform management processing, later described.

Figure 2:
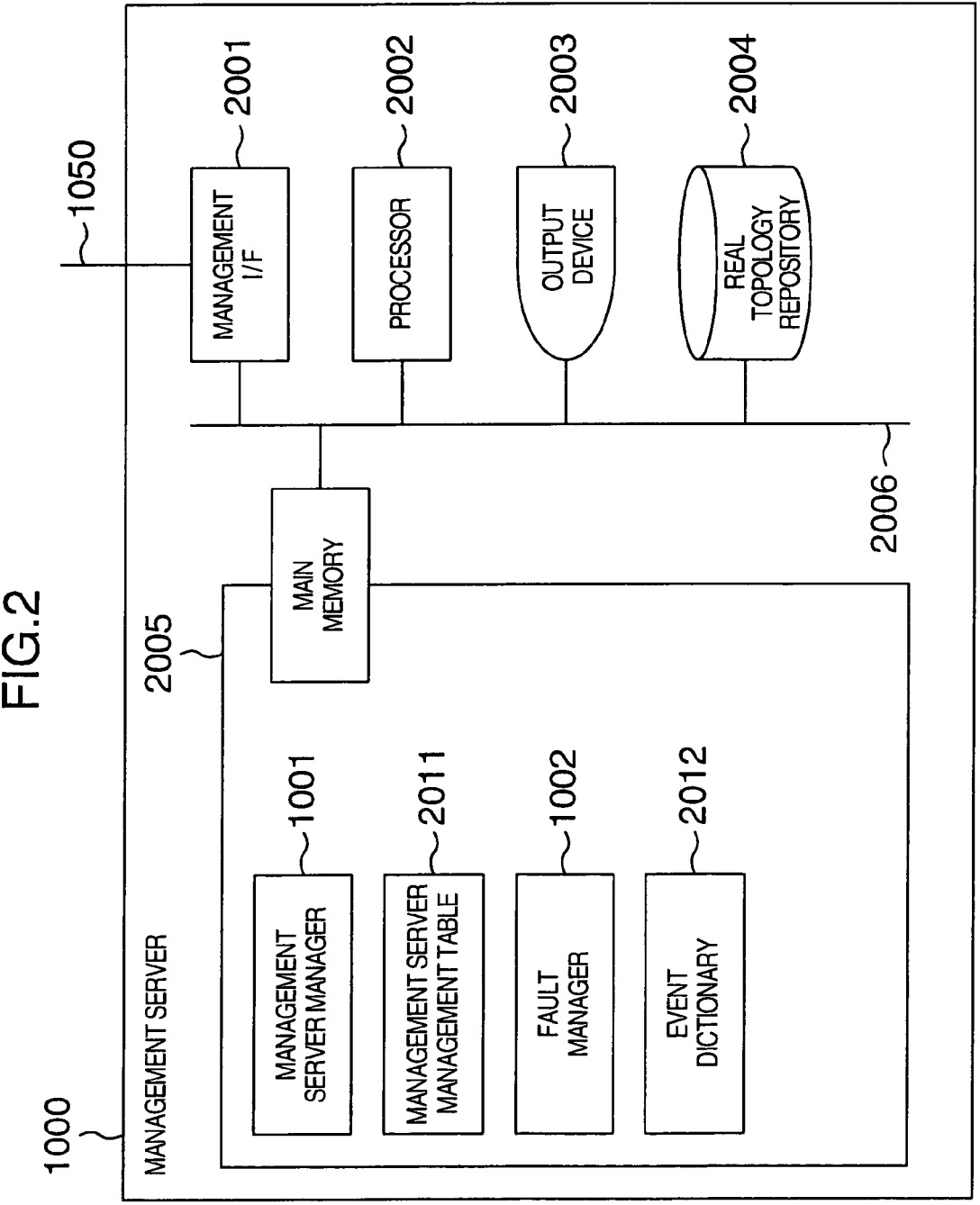
FIG. 2 is a block diagram illustrating an exemplary configuration of a management server device in the computer system of FIG. 1.
Figure 3:
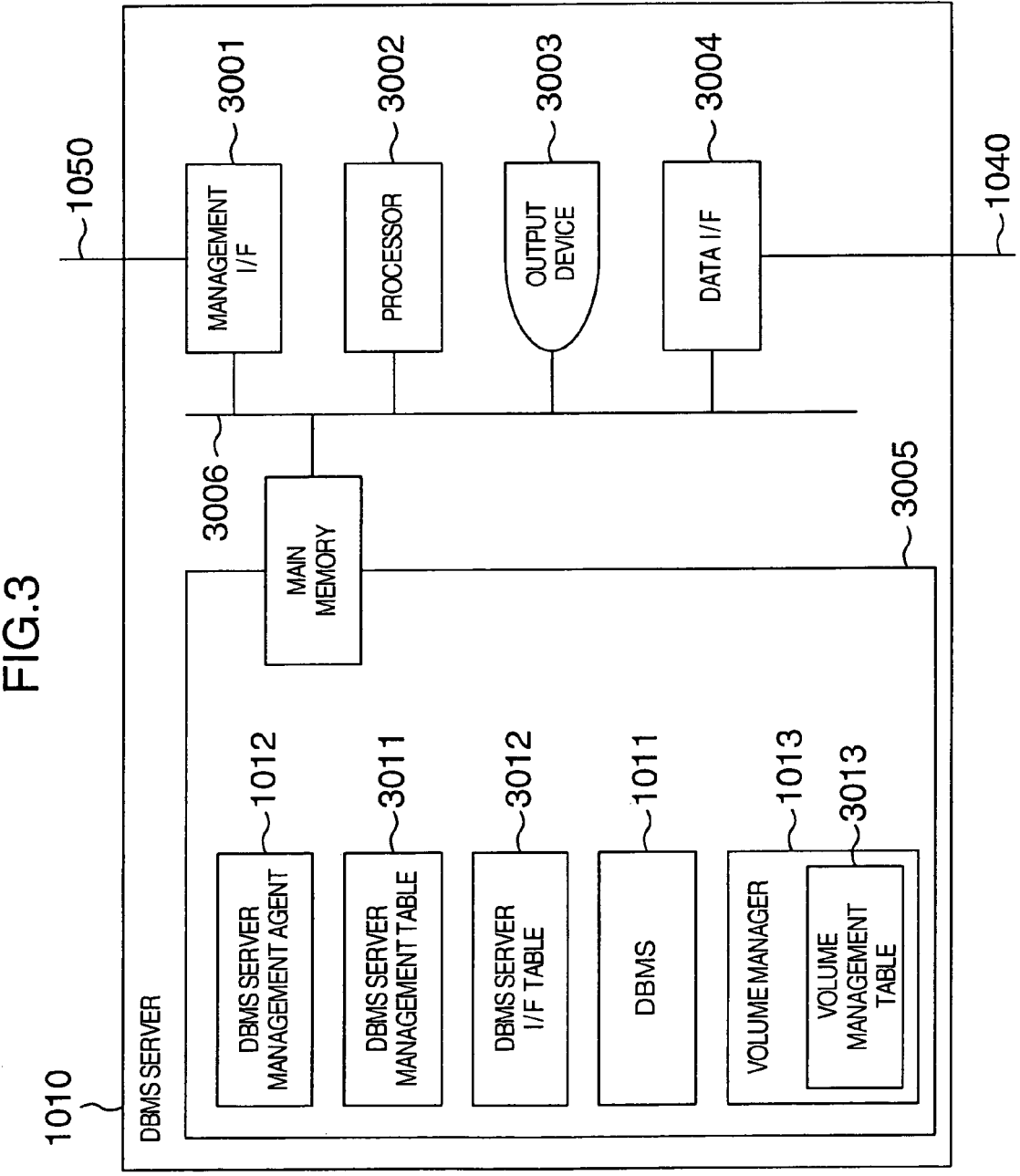
FIG. 3 is a block diagram illustrating an exemplary configuration of a DBMS server device in the computer system of FIG. 1.

FIG. 2 illustrates an exemplary configuration of the management server 1000. The management server 1000 comprises a processor 2002; a main memory 2005; a management I/F (interface) 2001 connected to the management network 1050; an output device 2003; and a real topology repository 2004. These devices are interconnected through a communication path 2006 such as an internal bus. The output device 2003 outputs the result of processing executed by the management server manager 1001. The real topology repository 2004 stores management table data and the like. The main memory 2005 stores the management server manager 1001, fault manager 1002, management server management table 2011, and event dictionary 2012. The management server manager 1001, which is a program executed by the processor 2002, receives data mapping information and fault notice messages from the respective devices. The fault manager 1002 is a program for managing faults. The management server management table 2011 is a table for holding data mapping information. The event dictionary 2012 stores dictionary information for interpreting fault detection messages.

FIG. 16 illustrates an exemplary configuration of the DBMS server 1010. The DBMS server 1010 comprises a processor 3002; a main memory 3005; a management I/F 3001 connected to the management network 1050; and one or more data I/Fs 3004 connected to the FC 1040. These devices are interconnected through a communication path 3006 such as an internal bus. The main memory 3005 stores the DBMS 1011 under execution; a volume manager 1013 for managing volumes; a DBMS server I/F table 3012; a DBMS server management table 3011; and a DBMS server management agent 1012. The DBMS server I/F table 3012 manages the interface to the FC 1040. The DBMS server management table 3011 comprises a collection of tables managed by the DBMS 1011 manipulated by a job, and volume manager management information. The DBMS server management agent 1012 is a program for managing the DBMS server management table 3011.

The volume manager 1013 recognizes virtual volumes provided by the switch 1020, collects one or more virtual volumes into a single virtual real volume which is provided to the DBMS server 1010. The volume manager 1013 is a program executed by the processor 3002. Though not shown in FIG. 3, the DBMS 1011 accesses the volume manager 1013 by way of a file system. The file system manages files on real volumes.

Figure 4:
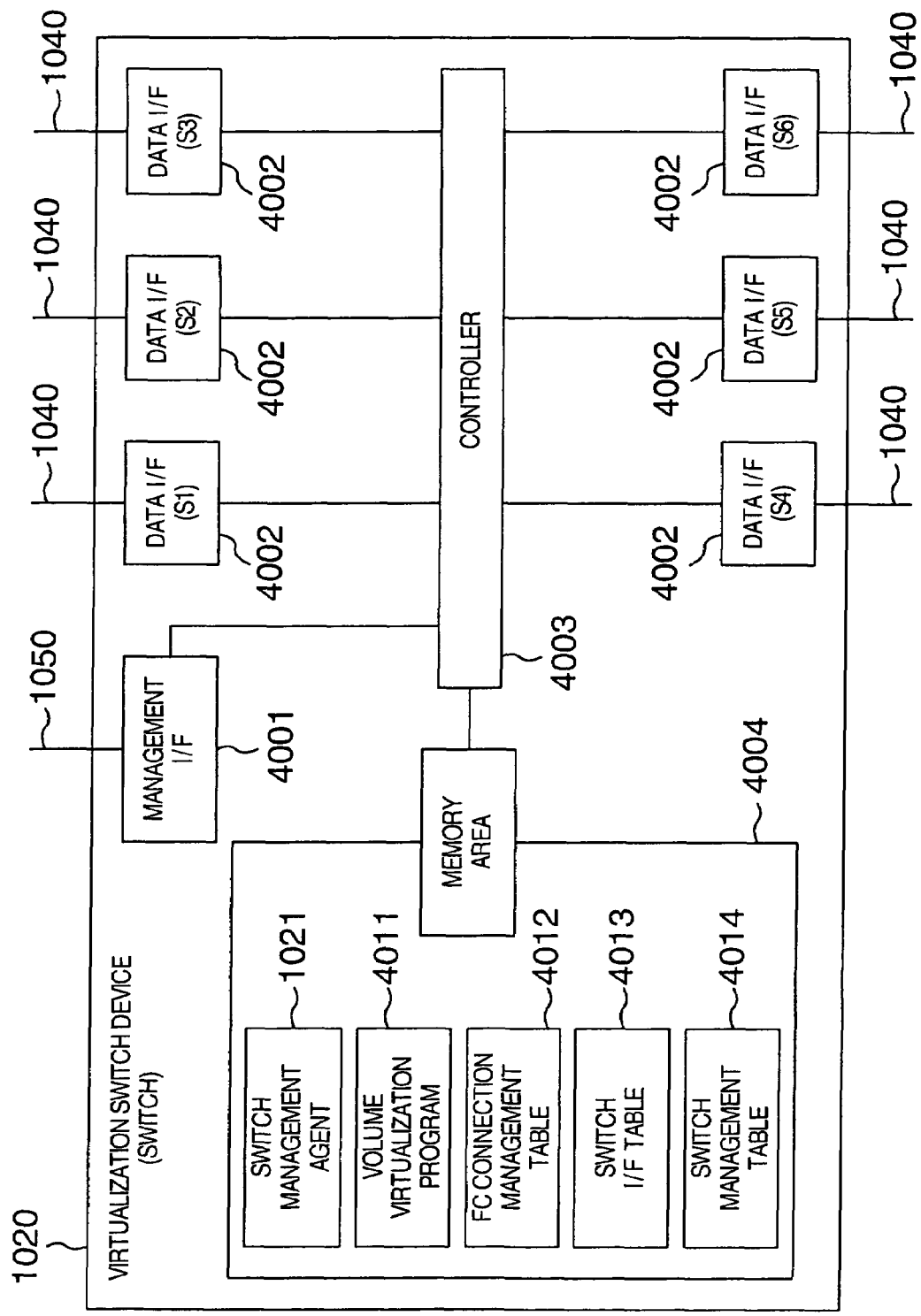
FIG. 4 is a block diagram illustrating an exemplary configuration of a virtualization switch device (switch) in the computer system of FIG. 1.

FIG. 4 illustrates an exemplary configuration of the switch 1020. The switch 1020 comprises a controller 4003; a memory area 4004; a management IF 4001 connected to the management network 1050; and a plurality of data I/Fs 4002 connected to the SAN. The memory area 4004, management I/F 4001 and data I/Fs 4002 are interconnected through the controller 4003. The controller 4003 implements switching and virtual storage functions for data which is transmitted and received through the FC 1040 of the SAN. The memory area 4004 stores the switch management agent 1021, volume virtualization program 4011, FC connection management table 4012, switch I/F table 4013, and switch management table 4014. The switch management agent 1021 is a program for communicating with the management server manager 1001 to transmit and receive management information on the switch 1020 for managing the switch management table 4014. The volume virtualization program 4011 implements the virtualization of storage areas. The FC connection management table 4012 stores information indicative of the topology among the switch 1020, DBMS server 1010, and storage device 1030 through the SAN. The switch I/F table 4013 holds management information on the data I/F 4002. The switch management table 4014 holds management information on virtual volumes.

The volume virtualization program 4011 converts an identifier of a virtual volume included in an input/output request received from the DBMS server 1010 into an identifier of a logical disk unit with reference to the switch management table 4014.

In this embodiment, the switch 1020 has six data I/Fs 4002 (S1, S2, S3, S4, S5, S6), but it may have any number of data I/Fs equal to or larger than one. In the illustrated example, the data I/Fs 4002 designated by identifiers S1, S2, S3 are connected to the DBMS server 1010. The data I/Fs 4002 designated by identifiers S4, S5, S6 are connected to the storage device 1030.

Figure 5:
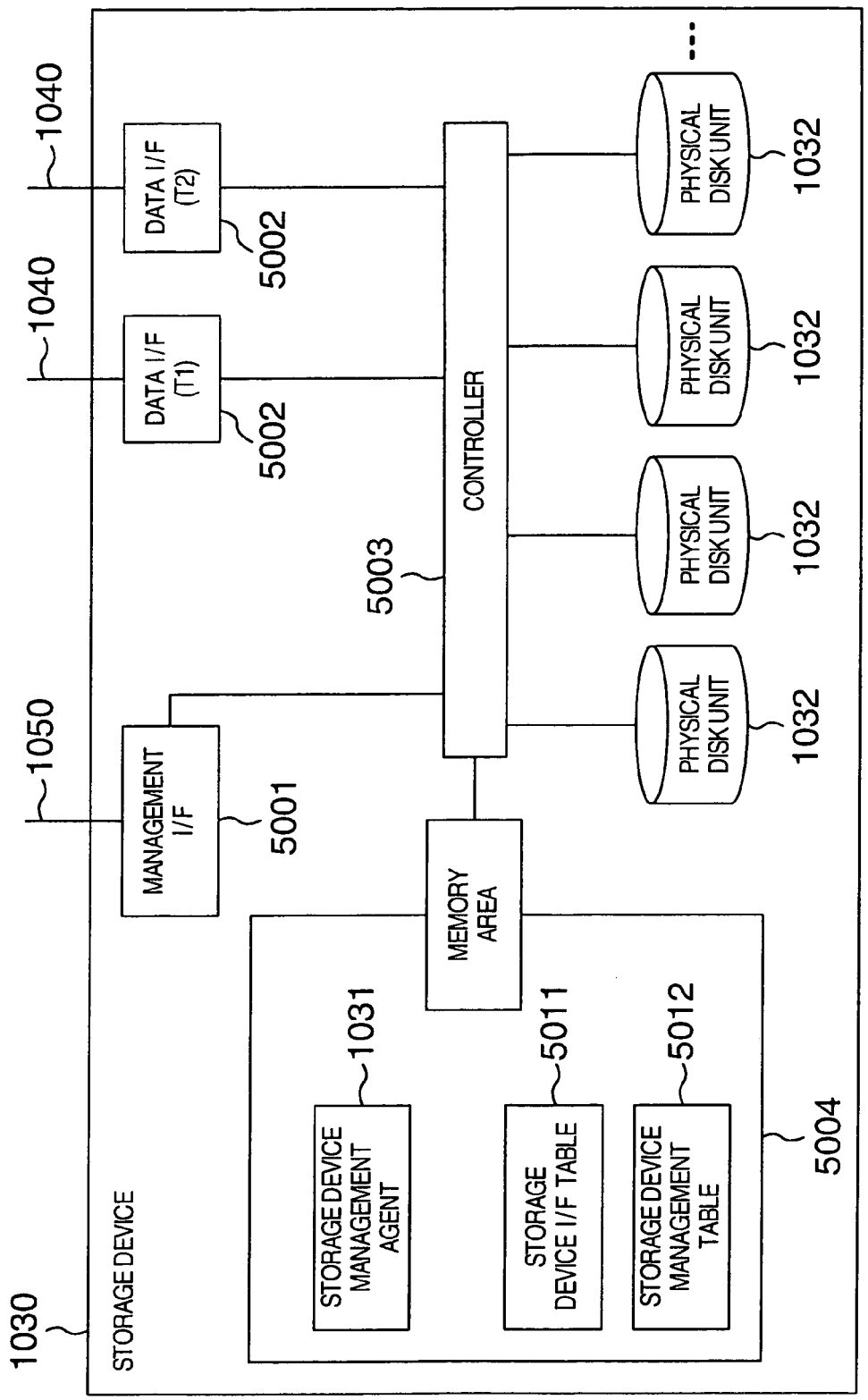
FIG. 5 is a block diagram illustrating an exemplary configuration of a storage device in the computer system of FIG. 1.
Figure 6:
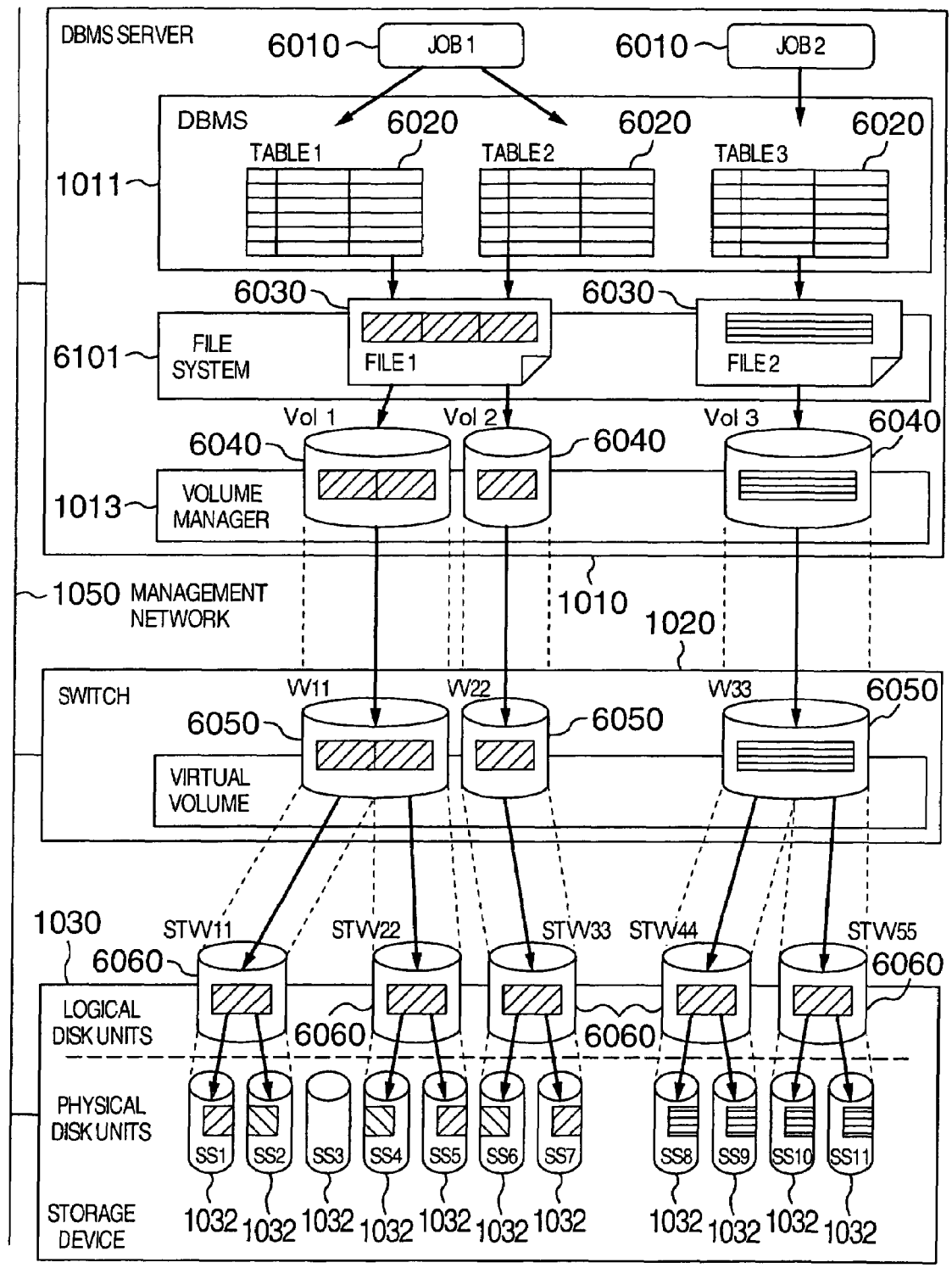
FIG. 6 is a schematic diagram illustrating an exemplary hierarchical structure of data mapping.

FIG. 5 illustrates an exemplary configuration of the storage device 1030 in greater detail. The storage device 1030 comprises a controller 5003 for controlling the storage device 1030 itself; a memory area 5004; a management IF 5001 connected to the management network 1050; one or more data I/F 5002 connected to the FC 1040 of the SAN; and a physical disk 1032. The memory area 5004, management I/F 5001, and data I/F 5002 are interconnected through the controller 5003. The physical disk 1032 comprises one or more physical disk units which make up a storage area provided for the DBMS server 1010 and switch 1020.

The memory area 5004 stores the storage device management agent 1031, storage device I/F table 5011, and storage device management table 5012. The storage device management agent 1031 is a program for communicating with the management server manager 1001 to transmit and receive management information on the storage device 1030 therebetween for managing the storage device management table 5012. The storage device I/F table 5011 holds management information on the data I/F 5002. The storage device management table 5012 holds management information on the physical disks 1032.

In this embodiment, the storage device 1030 has two data I/Fs 5002 (T1, T2) and 11 physical disks 1032 (SS1, SS2, . . . , SS11), but it may have any number of data I/Fs 5002 and physical disks 1032 equal to or larger than one.

FIG. 6 illustrates an exemplary hierarchical structure of data mapping. The DBMS server 1010 has two jobs 6010; three tables 6020 manipulated by these jobs 6010; two files 6030 on a file system 6101; and three real volumes 6040 managed by the volume manager 1013. The switch 1020 has three virtual volumes 6050. The storage device 1030 has five logical disk units 6060 and 11 physical disk units 1032. The table data 6020 on the DBMS server 1010 is stored in the file 6030 on the file system 6101. The file 6030 is distributively stored in the real volumes 6040 on the volume manager 1013. The real volumes 6040 are stored in the virtual volume 6050 of the switch 1020. One real volume 6040 may be distributively stored in a plurality of virtual volumes 6050. The virtual volumes 6050 are distributively stored in the physical disk units 1032 through the logical disk unit 6060 of the storage device 1030.

In this embodiment, among the overall data mapping, the data mapping mainly involved in the hierarchical structure under the real volumes 6040 is particularly called "volume mapping."

As illustrated in FIG. 6, a data mapping path can be identified from a particular job to a particular physical device through logical volumes. On the data mapping path, there is a particular interface for connecting one device to another, or particular physical disks.

In the example illustrated in FIG. 6, the jobs 6010 reside in the DBMS server 1010, but they may reside in any computing device such as an application server, a client terminal, or the like, not shown. These jobs 6010 are executed under control of an operating system (OS) which runs on the device in which the jobs 6010 reside and its job management function. The data mapping hierarchical structure may be more degenerated in this embodiment. For example, the DBMS 1011 may be removed such that the jobs 6010 directly access the file 6030. Alternatively, the switch 1020 may be removed such that the real volumes 6040 are directly mapped to the logical disk units 6060. Further alternatively, the switch 1020 and logical disk unit 6060 may be removed such that the real volumes 6040 are directly mapped to the physical disk units 1032.

Figures 7, 8:
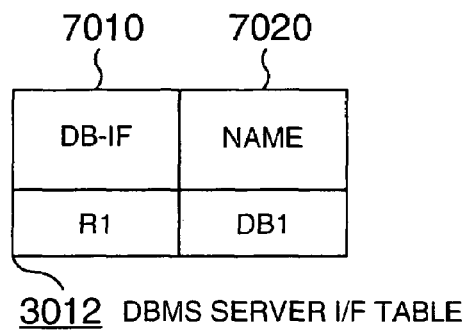
FIG. 7 shows an example of an I/F table held by the DBMS server device.
FIG. 8 shows an example of a DBMS server management table held by the DBMS server device.

FIG. 7 shows an example of the DBMS server I/F table 3012 held by the DBMS server 1010. A DB-I/F column 7010 of the DBMS server I/F table 3012 stores the identifier of an I/F through which the DBMS server 1010 is connected to the SAN, while a name column 7020 stores the name given to each I/F identifier.

FIG. 8 shows an example of the DBMS server management table 3011 held by the DBMS server 1010. A DBMS-ID column 8010 of this table stores a DBMS identifier which can be uniquely identified by the management server 1000. A job ID column 8020 stores a job identifier. A table name column 8030 stores the identifier of a table manipulated by the DBMS 1010. A file name column 8040 stores the file name of the file 6030 which stores the table 6020. A real volume name column 8050 stores the identifier of the real volume 6040 which stores the file 6030. A DB-I/F column 8060 stores the identifier of an I/F for connection to the SAN, held by the server 1010. An SCSI-ID column 8070 stores the identifier of an I/F of the destination. An LUN column 8080 stores the identifier of a logical unit number (LUN) for accessing a volume in a SCSI target device.

FIG. 9 shows an example of the switch I/F table 4013 held by the switch 1020. A data I/F-ID column 9010 of this table stores the identifier of an I/F provided in the switch 1020. A virtual data I/F-ID column 9020 stores the identifier which is recognized by the DBMS server device 1010 as the identifier of the data I/F 4002. A SCSI-ID column 9030 stores the identifier of a SCSI ID assigned to the virtual volume 6050.

FIG. 10 shows an example of the FC connection management table 4012 held by the switch 1020. An I/F column 10010 of this table stores the identifier of an I/F provided in the switch 1020 for connection with the SAN. A switch side name column 10020 stores the name given to each I/F 4002 for connection with the SAN. A destination name column 10030 stores the name of a destination to which each I/F is connected through the SAN.

FIG. 11 shows an example of the switch management table 4014 held by the switch 1020. First, a virtual volume section 11100 of the switch management table 4014 will be described. A virtual data I/F-ID column 11110 stores the identifier of a virtual volume I/F. A SCSI-ID column 11120 stores a SCSI identifier assigned to a virtual volume. A LUN column 11130 stores a SCSI-LUN for accessing the virtual volume 6050 through a virtual data I/F. A virtual volume ID column 11140 stores an identifier arbitrarily assigned to the virtual volume 6050 which is accessed through a virtual data I/F.

Next, a logical disk section 11200 will be described. A real data I/F-ID column 11210 stores the identifier of an I/F of the switch 1020 for use in an access to the logical disk 6060 which forms part of the virtual volume 6050. A SCSI-ID column 11220 stores the identification number of a SCSI target device which is the destination of a real data I/F. A LUN column 11230 stores a SCSI-LUN for use in an access to the logical disk 6060 through a real data I/F.

FIG. 12 shows an example of the storage device I/F table 5011 held by the storage device 1030. A data I/F-ID column 12010 of this table stores the identifier of an I/F provided in the storage device 1030 for connection with the SAN. A storage side name column 12020 stores the name given to the I/F for connection with the SAN. A virtual data I/F ID column 12030 stores the identifier of the data I/F 5002 for use in an access to the physical disk 1032 on the storage device 1030. A SCSI ID column 12040 stores the LUN of a SCSI target device which is the destination of a real data I/F.

FIG. 13 shows an example of the storage device management table 5012 held by the storage device 1030. First, a logical disk section 13100 of the storage device management table 5012 will be described. A virtual data I/F ID column 13110 stores the identifier of the data I/F 5002 for use in an access to the physical disk 1032 on the storage device 1030. A SCSI-ID column 13120 stores the identification number of a SCSI target device which is the destination of a real data I/F. A LUN column 13130 stores a SCSI-LUN for accessing the physical disk 1032. A logical disk ID column 13140 stores an identifier arbitrarily assigned to the logical disk 6060 which is accessed through a virtual data I/F.

A physical disk ID column 13120 in the other physical disk section 13200 stores the identifier of a physical disk provided in the storage device 1030. A SCSI ID column 13220 stores the identification number of a SCSI target device which is the destination of a real data I/F. A SCSI-LUN column 13230 stores a SCSI-LUN assigned to the logical disk 6060 which is accessed through the real data I/F 5002.

FIG. 14 shows an example of the management server management table 2011 held by the management server 1000. The management server management table 2011 stores the result of processing, later described, performed on the information stored in the respective tables which are managed by the DBMS server management agent 1012, switch management agent 1021, and storage device management agent 1031, respectively, shown in FIG. 7 to 13.

First, a DBMS server section 14100 will be described. A DBMS-ID column 14101 stores a DBMS identifier which can be uniquely recognized by the management server 1000. A job ID column 14102 stores a job identifier. A table name column 14103 stores the identifier of a table manipulated by the DBMS 1010. A file name column 14104 stores the file name of the file 6030 which stores the table 6020, corresponding to the table 6020 manipulated by the DBMS 1010. A volume manager column 14105 sores the name of a volume which stores the file 6030. A DB-I/F column 14105 stores the identifier of an IF provided in the DBMS server 1010 for connection with the SAN.

Next, a switch section 14200 will be described. A switch I/F column 14201 stores the identification of an I/F provided in the switch 1020 for connection with the SAN. A virtual volume ID column 14211 in a virtual volume subsection 14210 stores an identifier arbitrarily assigned to the virtual volume 6050 which is accessed through a virtual data I/F. A virtual data I/F-ID column 14212 stores the identifier of a virtual volume I/F. A SCSI-ID column 14213 stores a SCSI identifier assigned to a virtual volume. A LUN column 14214 stores a SCSI-LUN assigned to the virtual volume 6050 which is accessed through a virtual data I/F.

Next, a storage device real volume subsection 14220 will be described. A real data I/F-ID column 14221 stores the identifier of an I/F of the switch 1020 for use in an access to the logical disk 6060 which forms part of the virtual volume 6050. A SCSI-ID column 14222 stores the identification number of a SCSI target device which is the destination of a real data I/F. A LUN column 14223 stores a SCSI-LUN assigned to the logical disk unit 6060 which is accessed through a real data I/F.

Next, a storage device section 14300 will be described. A data I/F ID column 14301 stores the identifier of an I/F provided in the storage device 1030 for connection with the SAN. A logical disk subsection 14310 will be described. A virtual data I/F ID column 14311 stores the identifier of the data I/F 5002 for use in an access to the physical disk 1032 on the storage device 1030. A SCSI-ID column 14312 stores the identification number of a SCSI target device which is the destination of a real data I/F. A LUN column 14313 stores a SCSI-LUN for accessing the physical disk 1032. A logical disk ID column 14314 stores an identifier arbitrarily assigned to the logical disk 6060 which is accessed through a virtual data I/F.

Next, a physical disk subsection 14320 will be described. A physical disk ID column 14321 stores the identifier of a physical disk which is provided in the storage device 1030. A SCSI ID column 14322 stores the identification number of a SCSI target device which is the destination of a real data I/F. A SCSI-LUN column 14323 stores a SCSI-LUN assigned to the logical disk unit 6060 which is accessed through the real data I/F 5002.

The management server management table 2011 permits the management server 1000 to know, on a job-by-job basis, which of tables 6020 in the DBMS servers 1010 the job 6010 references, which of the files 6030 and volumes 6040 the job 6010 uses, how the job 6010 accesses the physical disk 1032 on the storage device 1030 through which virtual volume 6050 in the switch 1020. The management server management table 2011 is updated each time a change is made in any of the DBMS server management table 3011, switch management table 4014, and storage device management table 4012. In other words, the management server 1000 is monitoring at all times the most recent states related to the data mapping of the respective devices through the management server management table 2011.

FIG. 15 shows an example of the event dictionary 2012 held by the management server 1000. Each row of the event dictionary 2012 consists of a failed/recovered location 15020 corresponding to a fault code 15010; an identifier 1530 indicative of the failed/recovered location 15020; and a fault management ID 15040 assigned to each fault. The identifier 15030 indicates a fault code in a variable bindings field 16009 included in a fault notice message transmitted from a failed device to the management server 1000. A fault management ID 15040 is an identifier used for managing a fault from its occurrence to its recovery.

Figure 16A:
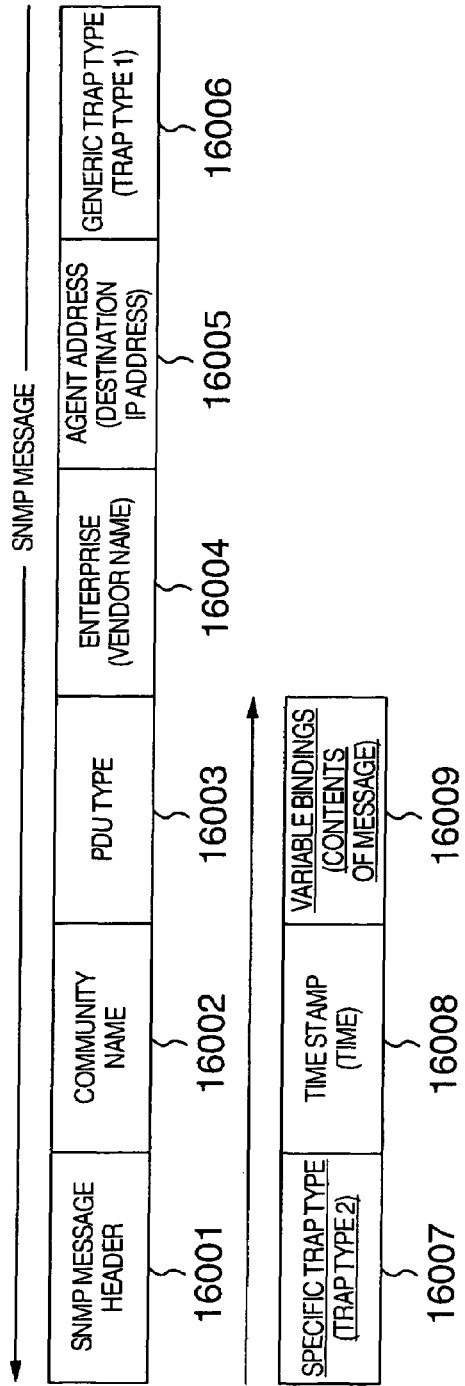
FIG. 16A is a schematic diagram illustrating a format for a fault notice message.
Figure 16B:
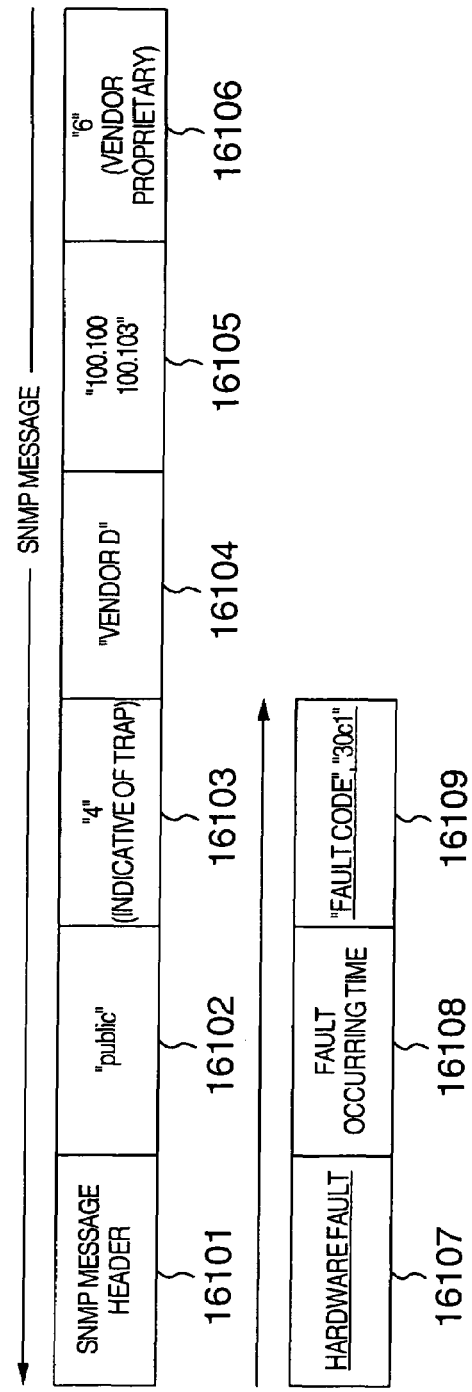
FIG. 16B is a schematic diagram illustrating an exemplary fault notice message.

FIGS. 16A and 16B illustrate a format for the fault notice massage (hereinafter called the "Trap message") of the SNMP protocol, and an example of this message, respectively. The current fault monitoring function based on SAN management software often uses the Trap message, so that this embodiment also uses the Trap message to notify a fault.

The Trap message format defined in the SNMP protocol illustrated in FIG. 16A is comprised of fields shown therein. A community name field 16002 indicates the destination to which the message is transmitted. A PDU (Protocol Data Unit) type field 16003 indicates the type of a message. An enterprise field 16004 indicates the name of the vendor which has sold a source device. An agent address field 16005 indicates an IP address of the destination. A generic Trap type field 16006 indicates the type of the Trap message. A time stamp field 16008 indicates the time at which the message is transmitted. A variable bindings field 16009 stores the contents of the message.

When the value in the PDU type field 16003 is "4," the associated message is determined to be a Trap message. When the value in the generic Trap type field 16006 is "6," the Trap message is determined to be based on definitions inherent to the vendor of the source device. In this event, the Trap message must be interpreted based on the contents of a specific Trap type field 16007 defined by the particular vendor, and the variable bindings field 16009 (underlined in FIG. 16A).

The Trap message illustrated in FIG. 16B is an exemplary Trap message which is transmitted to the fault manager 1002 of the management server 1000 for notifying the fault manager 1002 of a hardware fault in the storage device 1030. In the illustrated example, since the value in the PDU type field 16103 is "4," and the value in the generic Trap type field 16106 is "6," this message is determined to be a Trap message based on definitions inherent to the vendor of the source device.

On the other hand, when the human manager defines to store the type of fault in the specific Trap type 16107 and a fault code indicative of a failed location in the variable bindings field 16109, the message indicates that a hardware fault occurs at a location identified by a fault code "30c1." The message is not only sent from a failed device to the management server 1000 when a fault occurs, but is also sent to the management server 1000 when the fault is recovered in the failed device. When the message is sent upon recovery from a fault, the variable bindings field 16109 stores a fault code indicative of a fault recovered location.

Figure 17:
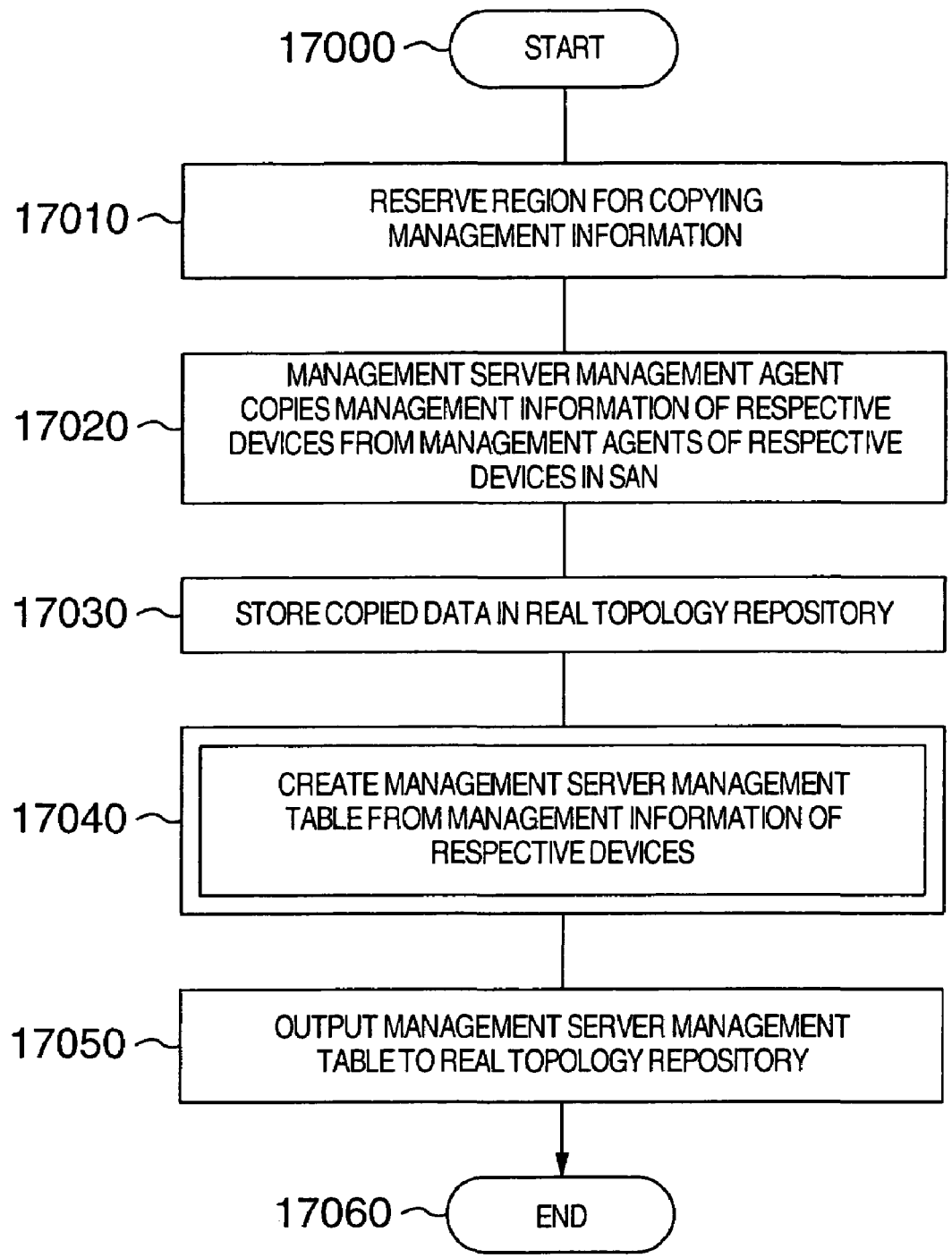
FIG. 17 is a flow chart illustrating an exemplary processing routine executed in the management server to create the management server management table from management information of the respective devices.

FIG. 17 is a flow chart illustrating a processing procedure involved in the data mapping executed in the management server 1000. The management server 1000 executes the data mapping for each of the jobs 6010 through this processing procedure using information from the respective DBMS server 1010, switch 1020, and storage device 1030. The management server manager 1001 reserves an area on a memory for copying management information on the respective devices (step 17010). Next, the management server manager 1001 communicates with the DBMS server management agent 1012, switch management agent 1021, and storage device management agent 1031 through the management network 1050 to copy the management information on the respective devices shown in FIGS. 8 to 13 (step 17020). Next, the management server manager 1001 stores the management information on the respective devices copied at step 17020 in the real topology repository 2004 (step 17030). Next, the management server manager 1001 creates the management server management table 2011 unique to the management server 1000, as shown in FIG. 14, based on the information copied at step 17020 (step 17040). Next, the management server manager 1001 stores the created management server management table 2011 in the real topology repository 2004 provided in the management server 1000 (step 17050).

The management information shown in FIGS. 8 to 13, acquired from the respective DBMS server 1010, switch 1020, and storage device 1030 may change at all times depending on the states of the respective devices. The management server 1000 updates the management server management table 2011 in accordance with the processing procedure illustrated in FIG. 17 each time any management information changes.

Figure 18:
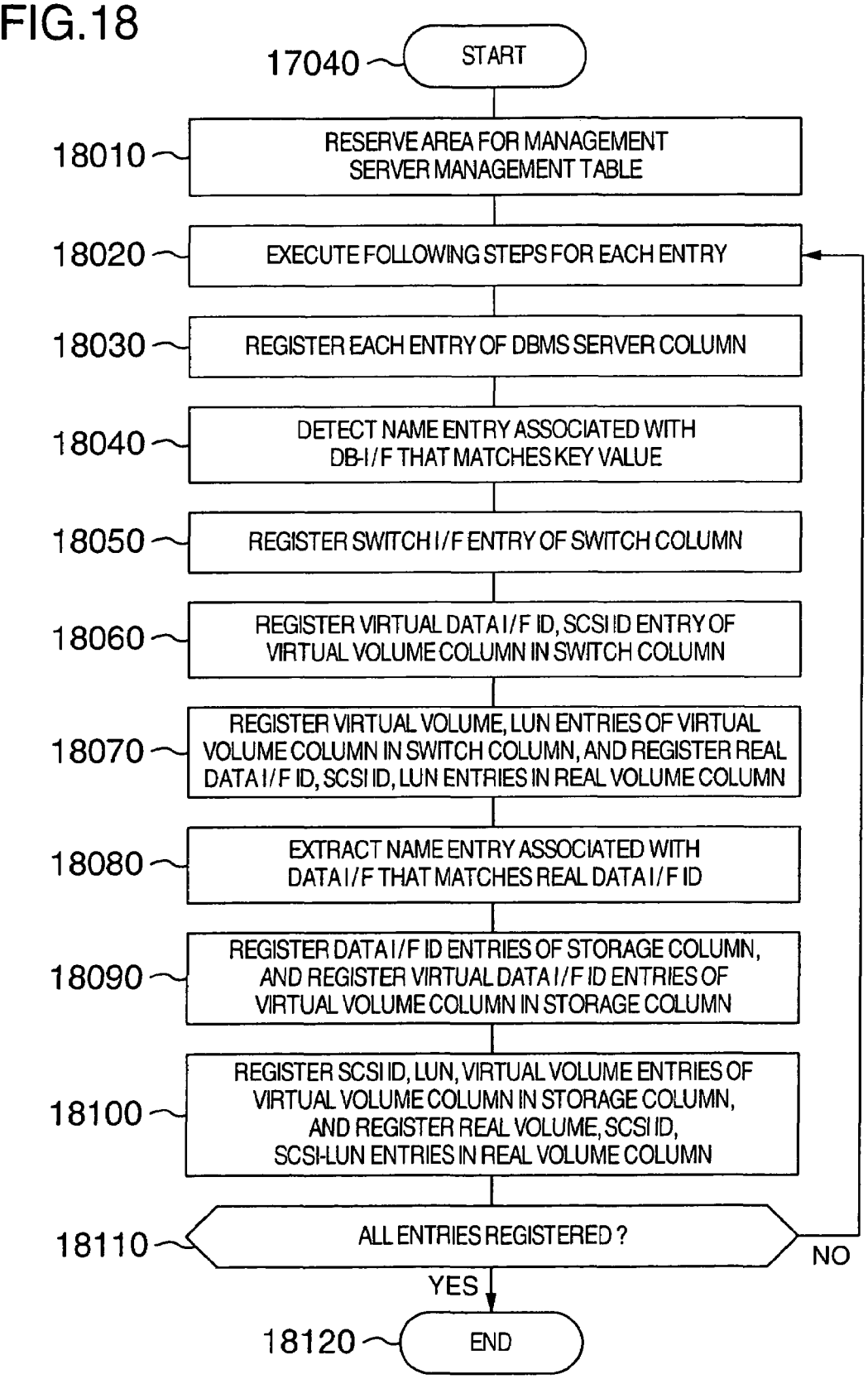
FIG. 18 is a flow chart illustrating in greater detail an exemplary processing routine executed in the management server device to create the management server management table.

FIG. 18 is a flow chart which illustrates in greater detail the processing at step 17040 for creating the management server management table 2011. The management server manager 1001 communicates with the DBMS server 1010, switch 1020, and storage device 1030 through the management network 1050 to create the management server management table 2011 based on the DBMS server management table 3011, switch management table 4014, and storage device management table 5012 of the respective devices. The management server manager 1001 executes the following processing on all entries in the management server management table 2011 which is to be created.

First, the management server manager 1001 reserves an area on the memory for the management server management table 2011 to be created (step 18010). Next, the management server manager 1001 executes the following processing on each of the entries in the management server management table 2011 (step 18020). The management server manager 1001 copies entries in the DBMS server management table 3011, acquired through the communication with the DBMS server management agent 1012 of the DBMS server 1010, into associated entries of the DBMS server section 14100 for registration therein (step 18030). The registered entries include the DBMS ID 8010, job ID 8020, table name 8030, file name 8040, real volume name 8050, and DB I/F 8060.

Next, the management server manager 1001 searches the DBMS server I/F table 3012 using a key which is the value in the DB-ID column 8060 on the DBMS server management table 3011 to detect an identifier in the name column 7020 on a row on which the value in the DB-IF column 7010 matches the value in the DB-IF column 8060 (step 18040). Next, the management server manager 1001 searches the FC connection management table 4012 using a key which is the detected identifier in the name column 7020 to detect the identifier in the data I/F column 10010 on a row on which the name in the destination name column 10030 matches the identifier in the name column 7020. The management server manager 1001 copies and registers the identifier detected in the data I/F column 10010 in the switch I/F entry 14201 of the switch section 14200 in the management server management table 2011 in correspondence to the DB I/F column 14106 in the DBMS server section 14100 (step 18050).

Next, the management server manager 1001 searches the switch I/F table 4013 using a key which is the identifier of the data I/F 10010 detected at step 18050 to detect the virtual data ID 9020 and SCSI ID 9030 which are associated with the data I/F-ID 9010 that matches the identifier of the data I/F 10010. Then, the management server manager 1001 copies the detected virtual data ID 9020 and SCSI ID 9030 into the virtual data I/F ID entry 14212 and SCSI ID entry 14213 of the virtual volume subsection 14210 in the switch section 14200 of the management server management table 2011 (step 18060).

Next, the management server manager 1001 searches the switch management table 4014 using keys which are the detected virtual data I/F ID 9020 and SCSI ID 9030 to detect the virtual volume ID 11140 in the virtual volume section 11100, and the real data I/F ID 11210, SCSI ID 11220, and LUN identifier 11230 in the logical disk section 11200 which are associated with the virtual data I/F ID 11110 and SCSI-ID 11120 that match the virtual data IF ID 9020 and SCSI ID 9030 used as the keys, respectively. Next, the management server manager 1001 copies the detected respective entries into the virtual volume ID 14211 and LUN column 14214 of the virtual volume subsection 14210 in the switch section 14200 of the management server management table 2011 as well as into the real I/F ID column 14221, SCSI ID column 14222, and LUN column 14223 in the storage device real volume subsection 14220, respectively (step 18070).

Next, the management server manager 1001 searches the FC connection table 4012 using a key which is the real data I/F ID 11210 detected at step 18070 to extract the identifier in the destination name 10030 which is associated with the data I/D 10010 that matches the key value (step 18080). Next, the management server manager 1001 searches the storage device I/F table 5011 using a key which is the identifier of the destination name 10030 extracted at step 18080 to detect the data I/F ID 12020 entry, virtual data I/F ID 12030 entry, and SCSI ID 12040 entry, which are associated with the storage side name 12020 that matches the key value, in the storage device I/F table 5011 of the storage device 1030. The management server manager 1001 copies the detected respective entries into the data I/F ID entry 14301 in the storage device section 14300 of the management server management table 2011, and the virtual data I/F ID entry 14311 in the logical disk subsection 14310, respectively (step 18090).

Next, the management server manager 1001 searches the storage device management table 5012 using keys which are the virtual data I/F ID entry 12020 and SCSI ID entry 12040 extracted at step 18090 to detect the respective entries, i.e., the LUN 13130 and logical disk ID 13140 in the logical disk section 13100, and the respective entries, i.e., the physical disk ID 13210, SCSI ID 13220, and SCSI-LUN 13230 in the physical disk section 13200. The management server manager 1001 copies the detected respective entries into the associated entries, i.e., the SCSI ID 14312, LUN 14313, and logical disk ID 14314 in the logical disk subsection 14310 of the storage device section 14300 in the management server management table 2011, as well as into the associated entries, i.e., the physical disk ID 14321, SCSI ID 14322, and SCSI-LUN 14323 in the physical disk subsection 14320 (step 18100).

Finally, the management server manager 1001 determines whether all the entries have been registered in the management server management table 2011, and returns to step 18020 if there is any entry which has not been registered (step 18110). Conversely, when all the entries have been registered, the management server manager 1001 completes the creation of the management server management table 2011. FIG. 14 shows part of the management server management table 2011 which is created by the foregoing processing.

Figure 19:
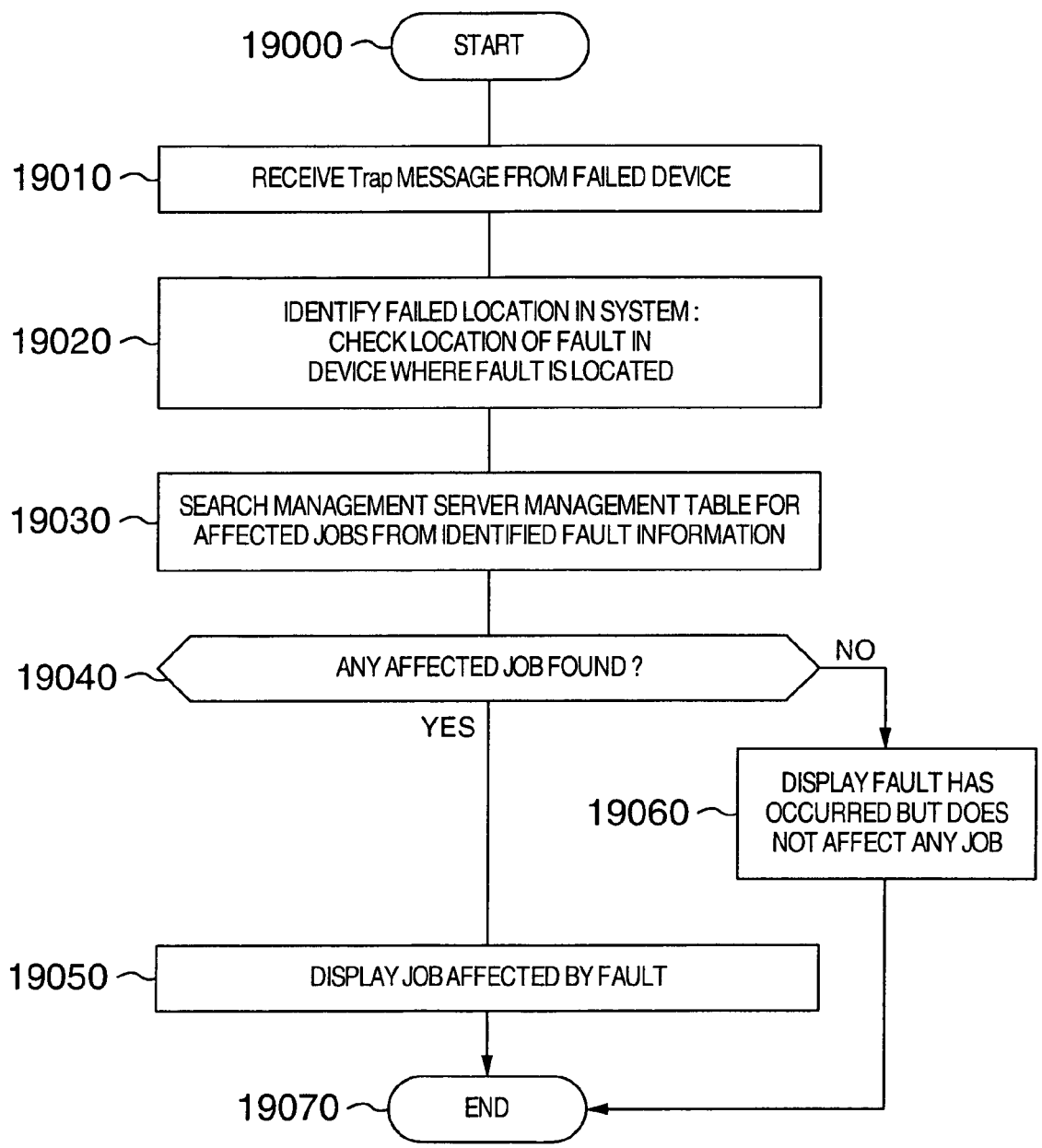
FIG. 19 is a flow chart illustrating an exemplary processing routine executed in the management server device to detect a location at which a fault occurs, and notify the fault.

FIG. 19 is a flow chart illustrating the processing procedure executed in the management server 1000 for detecting a fault, and for notifying the human manager of any job which is affected by a fault. The management server 1000 receives a Trap message from a failed device (step 19010). Specifically, details on a fault which has occurred in any of the DBMS server 1010, switch 1020, and storage device 1030 are communicated to the management server 1000, as represented by a fault code in the variable bindings field 16009 of the Trap message, as defined in the SNMP protocol. Upon receipt of the Trap message transmitted from the failed device, the fault manager 1002 searches the event dictionary held therein using a key which is the fault code in the variable bindings 16009 of the Trap message to extract the identifier 15030 and identify the failed device, and the location at which the fault has occurred (step 19020). Possible fault locations include interfaces or physical disk units in any of the devices registered in the management server management table 2011.

Figure 20:
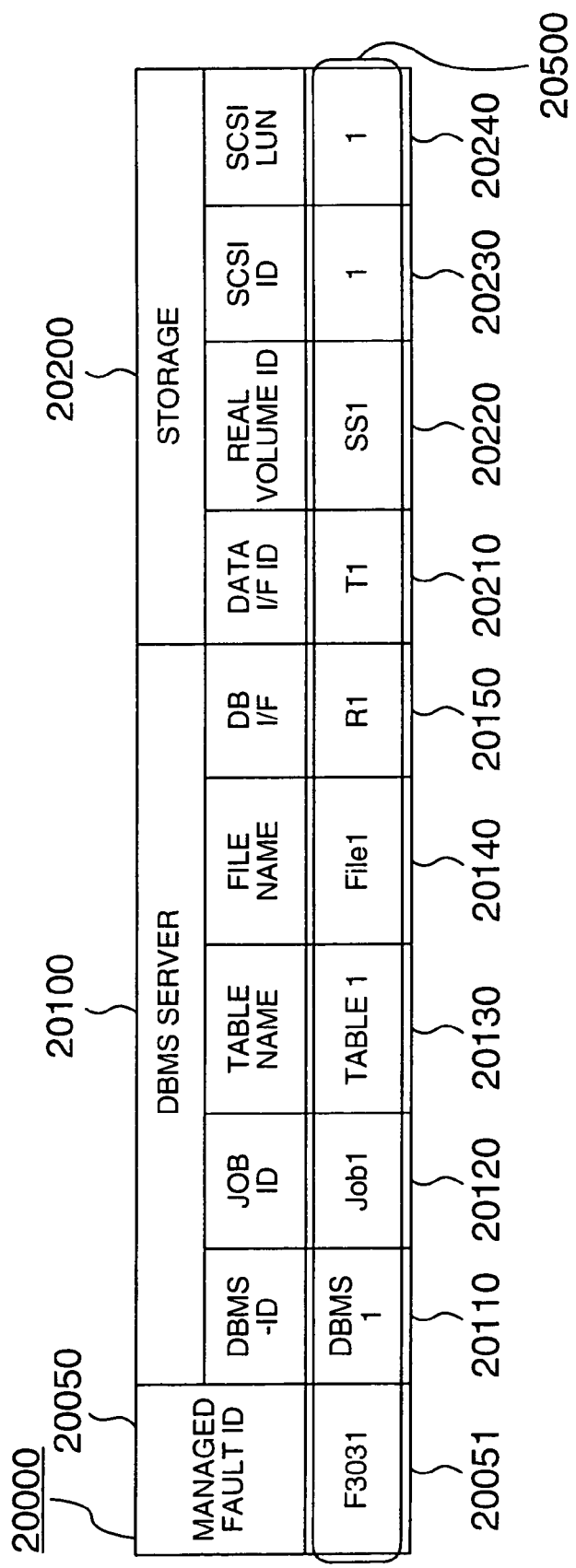
FIG. 20 is a table showing an exemplary result of extracting information on a job which is affected by a fault.

Next, the fault manager 1002 searches the management server management table 2011 using a key which is the identifier 15030 of the identified fault location to extract information necessary for notifying the fault (step 19030). The necessary information depends on a particular fault location. Extracted information is held until the failed device is recovered, together with information that is extracted using the fault management ID 15040 which is the key value. FIG. 20 shows exemplary information which is thus extracted and saved.

The fault manager 1002 determines from the results detected at step 19030 whether or not the fault occurs at a location that affects any of the jobs 6010 under execution (step 19040). When determining that some job is affected by the fault, the fault manager 1002 detects information necessary for display from the extracted information to display the affected job (step 19050).

FIG. 20 shows an exemplary result of the extraction at step 19030. Specifically, FIG. 20 shows the result of extraction when the management server 1000 detects the fault code 15010 "30c1" in the event dictionary 2012 from the Trap message, and is managed by the fault management ID 20050 "F3031." Since this example is given on the assumption that the storage device 1030 alone fails, FIG. 20 shows the relationship between the storage device 1030 and the DBMS server 1010 affected by the fault in the storage device 1030 for each of the jobs 6010 in each DBMS 1011. It should be noted that when a device other than the storage device 1030 fails, the result of extraction will be different in format from that shown in FIG. 20.

On the other hand, when determining that the fault will not affect any of the jobs 6010, the management server 1000 extracts information necessary for displaying "A fault has occurred though it will not affect any job under execution" from the information extracted at step 19030, and displays this message (step 19060).

The current software-based fault monitoring function for managing the SAN often utilizes the Trap message defined by RFC1157 "A Simple Network Management Protocol (SNMP)" which was created by IETF (Internet Engineering Task Force). However, in the DBMS server 1010, switch 1020, and storage device 1030 connected to the SAN, virtual volumes may be used in the switch 1020 or the like. It is therefore difficult to determine only from the Trap messages from the respective devices, which device fails at which location in the entire system and to predict how the fault will affect the components of the SAN. Thus, in this embodiment, the management server 1000 is provided with the fault manager 1002 which is operated in cooperation with the management server management table 2011 to eliminate this problem. The fault manager 1002 of the management server 1000 uses the event dictionary 2012 held in the management server 1000 to interpret the contents of a particular Trap message from each device. Then, the fault manager 1002 compares information on the management server management table 2011 stored in the real topology repository 2004 with information interpreted from the Trap message, and notifies the human manager if it determines that a fault will affect the execution of any job 6010. Here, the Trap message refers to a message which notifies the management server 1000 of a fault in any device through the management network 1050.

Consider now an example in which the fault code 15010 is "30c1," as shown in FIG. 16B. In this example, the storage device 1030 transmits a Trap message to the management server 1000, indicating that a fault occurs. Upon receipt of the Trap message, the fault manager 1002 references the event dictionary 2012, and searches fault code rows in the event dictionary 2012 using a key which is the fault code "30c1" in the Trap message. Then, the fault manager 1002 extracts the identifier 15030 of a retrieved row. Next, the fault manager 1002 searches the management server management table 2011 using a key which is the extracted identifier 15030. In this way, the fault manager 1002 can extract a row 14500 which includes the identifier 15030 that is used as a key, and narrow down jobs 6010 which will be affected by the DBMS server and the fault which has occurred. In the example shown in FIG. 16B, the fault will affect a job identified by the job ID 14102 "Job1." The relationship between the job 6010 and failed device is derived from the extracted information as shown in a row 20500 in FIG. 20. Then, the fault manager 1002 displays that the job 6010 is affected by the fault, based on the information in the derived row 20500, such as the DBMS-ID 20110, job ID 20120, DB I/F 20150, data I/F ID 20210, and the real volume ID 20220 at which the fault has actually occurred.

Figure 21:
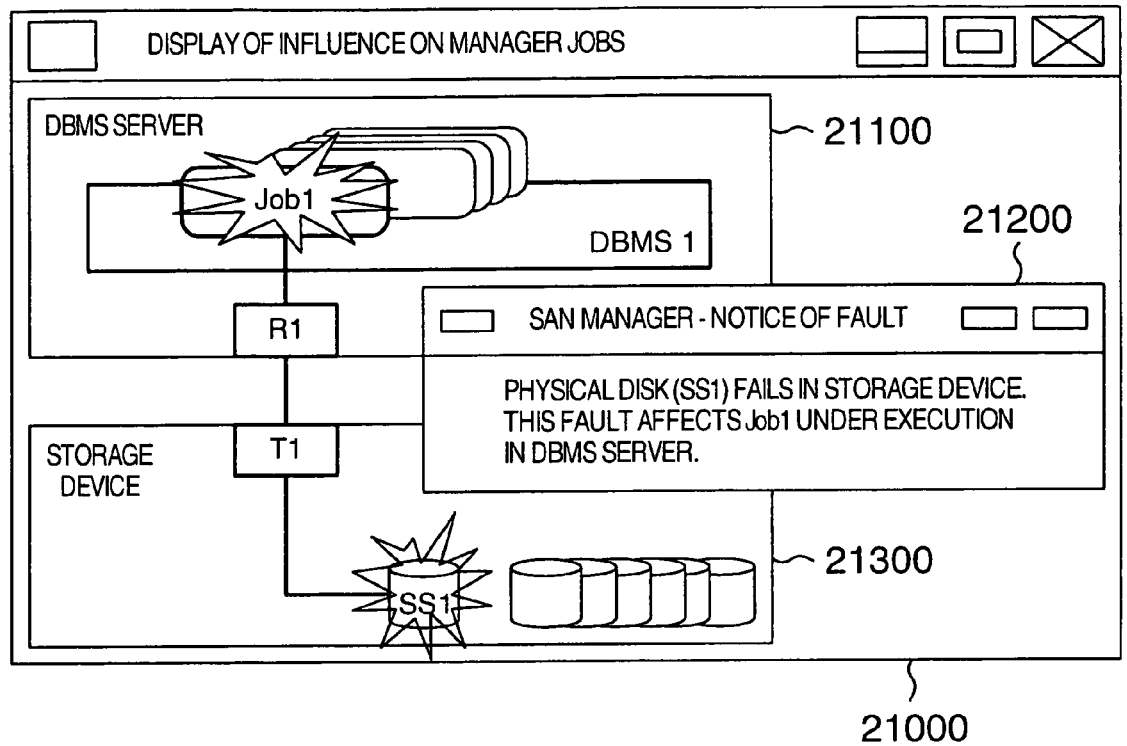
FIG. 21 is a diagram illustrating an exemplary display which is provided when a job is affected by a fault.

An exemplary display in this event is shown in FIG. 21. This exemplary display presents the location at which hardware fails in a failed device, together with a job affected by the fault. This permits the human manager to readily appreciate how the jobs 6010 are affected by the fault.

Figure 22:
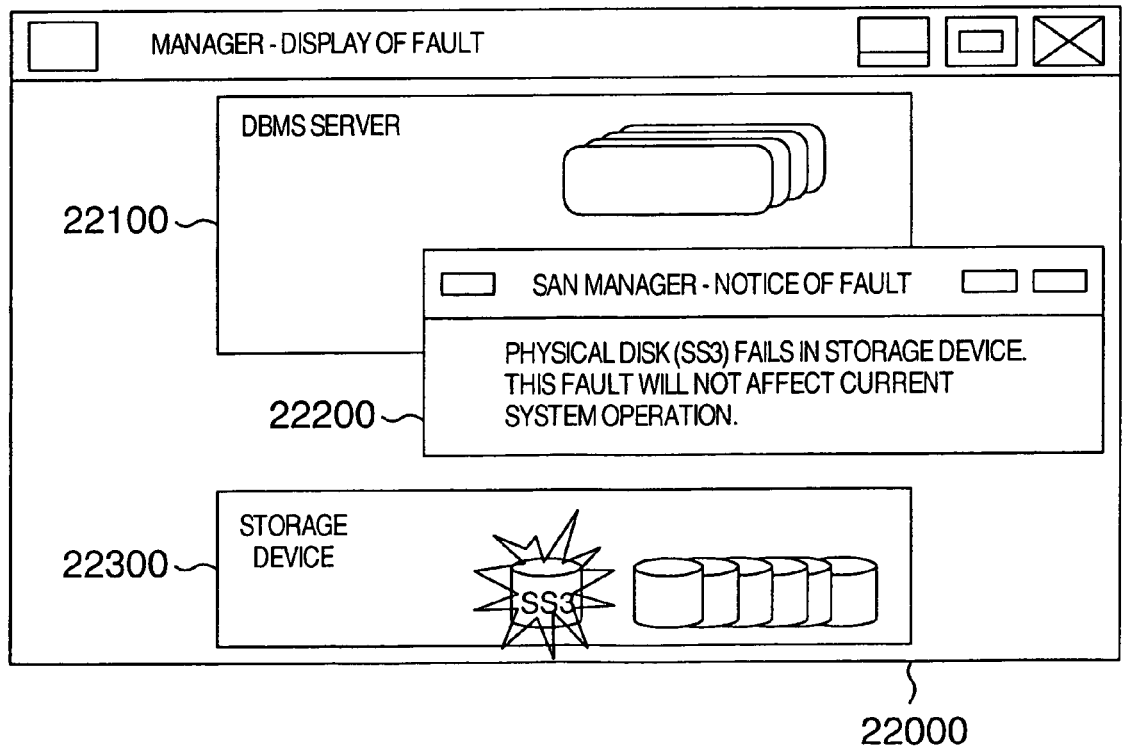
FIG. 22 is a diagram illustrating an exemplary display which is provided when a fault occurs but does not affect any job.

FIG. 22 shows another exemplary display which is provided when a fault occurs but does not affect any of the jobs 6010. The exemplary display 22000 is presented when a physical disk 1032 "SS3" fails in the storage device 1030 which is not used by any job 6010.

While the foregoing exemplary displays 21000, 22000 show a fault which occurs at a single location, the human manager may be notified in a similar manner when a plurality of faults occur.

The human manager can readily appreciate how each of the jobs 6010 under execution is affected by a fault by keeping track of the configuration of volume mapping among the DBMS server 1010, switch 1020, and storage device 1030 shown in the foregoing embodiment, and monitoring the respective devices for a fault.

(2) Second Embodiment

Control of Job Execution upon Occurrence of Fault

A second embodiment shows a technique for managing the execution of jobs which can be affected by a fault by previously determining the order in which the respective jobs are executed, before the execution of the jobs, in addition to the notification of a fault to the human manager upon occurrence of the fault, as shown in the first embodiment. Since the second embodiment follows the same steps until the identification of a failed location and the notification of the fault to the human manager shown in the first embodiment, the following description will be centered on different aspects from the first embodiment.

Figure 23:
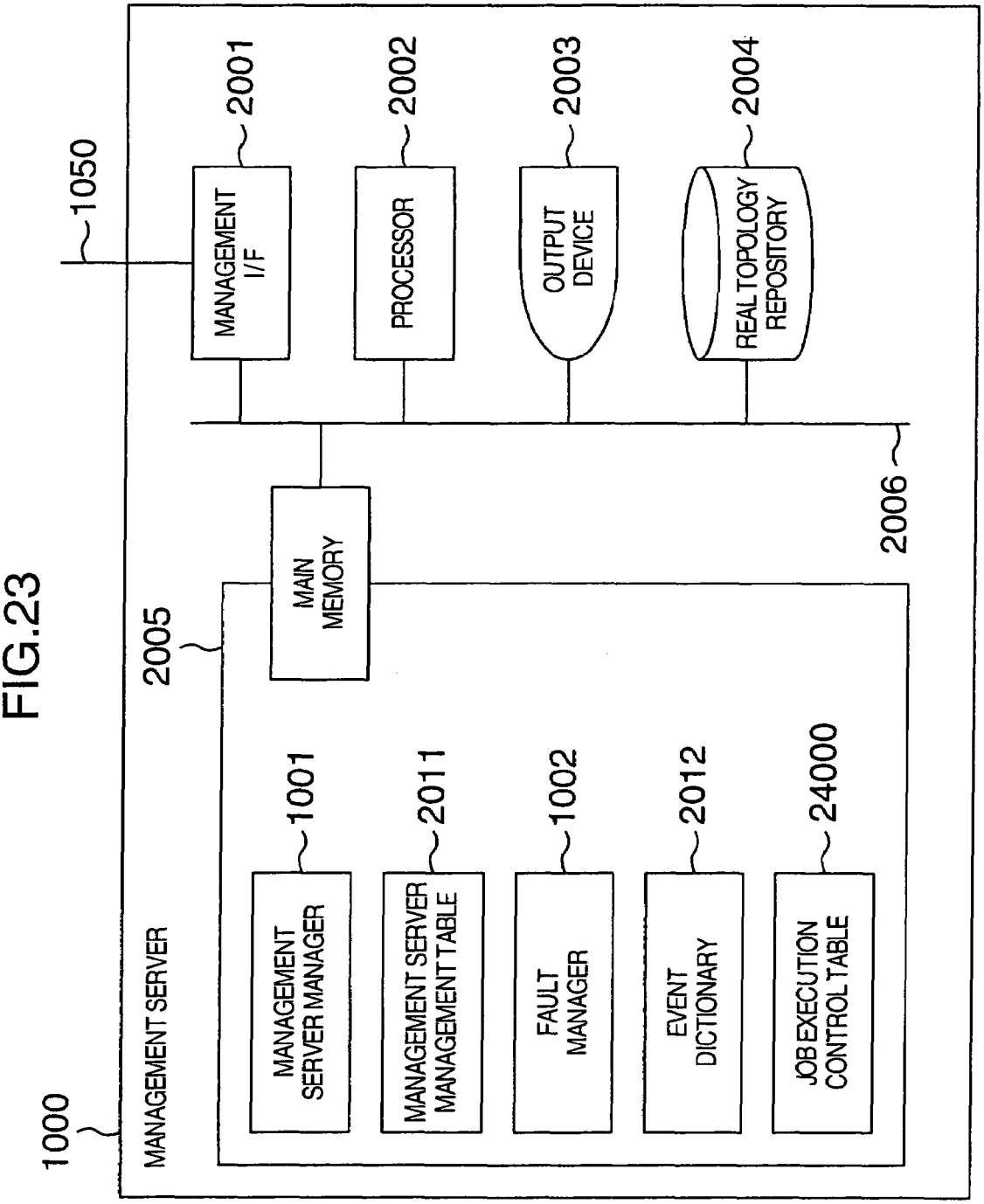
FIG. 23 is a block diagram illustrating an exemplary configuration of a management server device which is additionally provided with a job execution control table.

FIG. 23 illustrates an exemplary configuration of the management server 1000 in which a job execution control table 24000 is additionally provided in the main memory 2005 shown in FIG. 2. The job execution control table 24000 is stored in the real topology repository 2004 of the management server 1000.

FIG. 24 shows an exemplary data structure of the job execution control table 24000. A DBMS-ID column 24010 of the job execution control table 24000 stores the unique identifier assigned to the DBMS 1011 in the DBMS server device 1010. A job ID column 24020 stores the job ID of a job 6010 under execution associated with the DBMS server device 1010. An execution assigned device column 24030 stores the name of a device assigned to control the execution of jobs.

A priority column 24040 stores a processing priority of a job. Each job 6010 is given the priority which is set to "3" for a normal job, and to "5" for the highest priority job. A processing method column 24050 stores one of a consistent method for controlling the execution of the jobs 6010 by a previously provided processing method, and a variable method for controlling the execution of the jobs 6010 based on the execution times of the jobs 6010. A processing content column 24060 stores the contents of job execution control performed for an associated job. "Close" in the shown example involves closing data which has been accessed by the job. "Pause" in turn means that the job is paused.

A confirmation processing column 24070 stores an indication of whether or not the human manager must be requested to confirm that a device specified in the execution assigned device column 24030 executes the processing specified in the processing content column 24060 before the processing is actually executed. An automatic execution column 24080 must be filled for indicating whether or not the processing specified in the processing content column 24060 is automatically executed without confirming it to the human manager, when "not necessary" is set in the confirmation processing column 24070.

The consistent method registered in the processing method column 24050 refers to the execution of a job execution control previously registered by the human manager in the device specified in the execution assigned device column 24030. The variable method in turn refers to a dynamic job execution control based on execution times required for the respective jobs 6010, calculated from I/O and CPU monitoring information provided by the respective devices. The fault manager 1002 references the priority column 24040 when the calculated execution time of a job 6010 is longer than an execution time before a fault occurs. If the priority given to the executed job 601 is lower than the priority for a normal job, the fault manager 1002 performs the control processing specified in the processing content column 24060. The priority column 24040, processing method column 24050, and processing content column 24060 of the job execution control table 24000 are set by the human manager upon execution of the job 6010.

Figure 25:
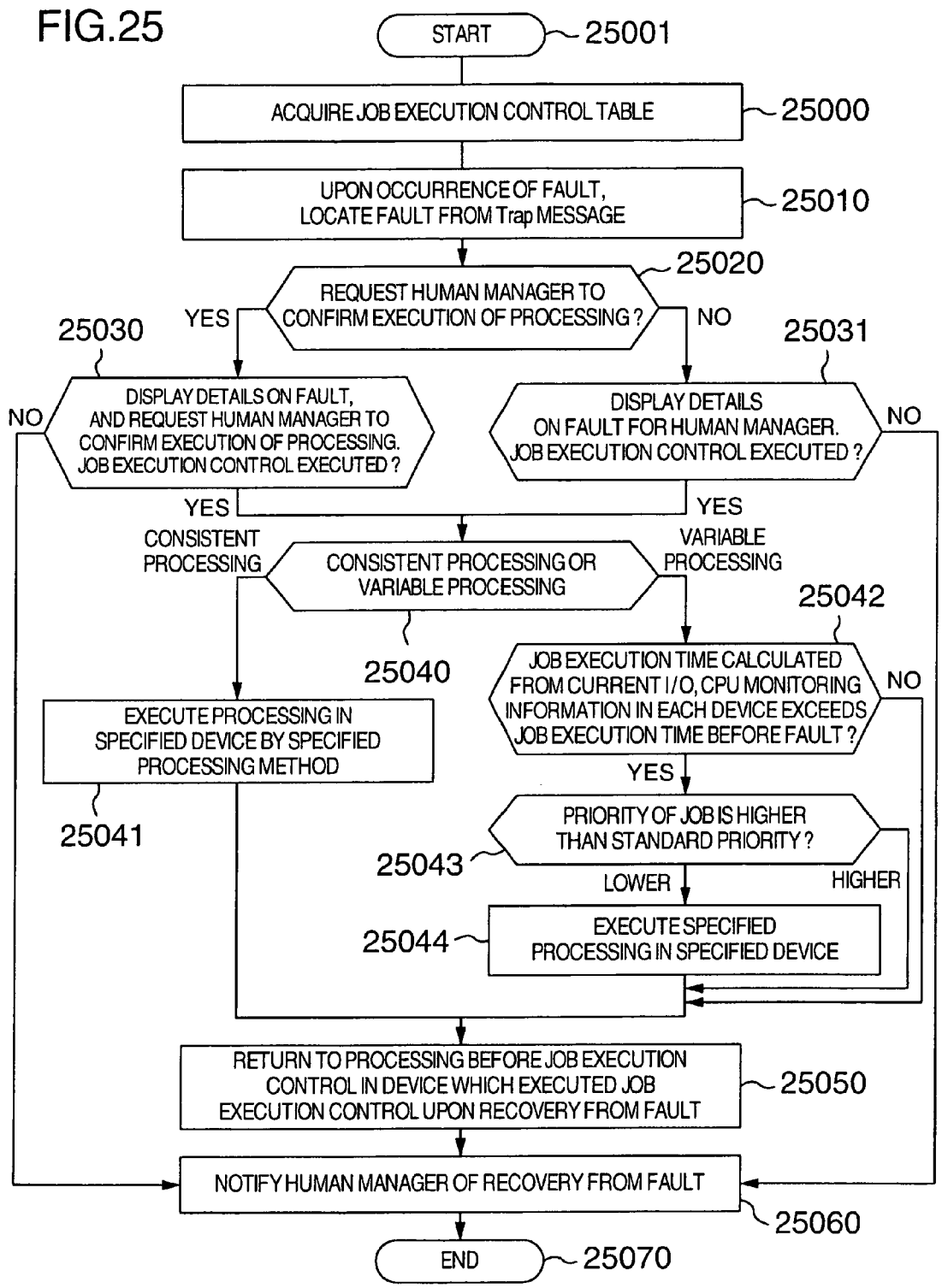
FIG. 25 is a flow chart illustrating an exemplary processing routine of a job execution control executed in the management server device.

FIG. 25 is a flow chart illustrating the flow of the job execution control processing executed by the fault manager 1002. This processing is executed by the fault manager 1002 unless otherwise specified. The fault manager 1002 first acquires the job execution control table 24000 registered by the human manager from the real topology repository 2004 (sep 25000). While the human manager creates the job execution control table 24000 upon execution of the job 6010, the job execution control table 24000 must be previously registered if a scheduler is used. Next, if a certain device fails, the fault manager 1002 locates the fault from a Trap message transmitted from the failed device in accordance with a procedure similar to that in the first embodiment (step 25010).

Next, the fault manager 1002 determines from information specified in the confirmation processing column 24070 of the job execution control table 24000 whether or not a confirmation is requested to the human manager for the execution of the job execution control for jobs which may be affected by the fault (sep 25020). When the fault manager 1002 determines at step 25020 that the confirmation is requested to the human manager, the flow proceeds to step 25030. On the other hand, when the job execution control processing is executed in accordance with data specified in the job execution control table 24000 without requesting the confirmation, the flow proceeds to step 25031.

Next, when the fault manager 1002 determines at step 25020 that the confirmation is requested to the human manager, the fault manager 1002 provides a display for the human manager, indicating that a fault occurs in a similar form to that in the first embodiment. With the display, the fault manager 1002 requests the human manager to confirm the job execution control for a job 6010 which is affected by the fault. If the human manager accepts the request, the flow proceeds to step 25040, where specific processing is selected. If the human manager denies the request, the fault manager 1002 waits until the failed device is recovered without performing the job execution control, followed by a transition of the flow to step 25060 (step 25030).

Next, when the fault manager 1002 determines at step 25020 that the job execution control is automatically executed based on the information stored in the job execution control table 24000, the fault manager 1002 provides a display for the human manager, indicating that a fault occurs in a similar form to that in the first embodiment, and determines whether or not the job execution control is executed from the information specified in the automatic execution column 24080 of the job execution control table 24000 (step 25031). The flow proceeds to step 25040 when the fault manager 1002 determines at step 25031 that the job execution control is automatically executed, and proceeds to step 25060 when determining that the job execution control is not automatically executed.

When the human manager accepts the request at step 25030 or when the fault manager 1002 determines at step 25031 that the job execution control is automatically executed, the fault manager 1002 determines whether it executes previously determined processing to implement the job execution control or executes processing which changes the priorities depending on job loading situations (step 25040). The determination is made based on the information specified in the processing method column 24050 of the job execution control table 24000.

When the consistent processing is determined at step 25040, the fault manager 1002 saves the state of the currently executed processing in the storage device for recovering the fault, and executes the job execution control in a device specified in the execution assigned device column 24030 of the job execution control table 24000 by a processing method specified in the processing content column 24060 (step 25041).

On the other hand, when the variable processing is determined at step 25040, the fault manager 1002 executes the following processing. First, the fault manager 1002 acquires I/O and CPU monitoring information for each of the DBMS server 1010, switch 1020, and storage device 1030. Assume that the management server 1000 is monitoring the I/O and CPU monitoring information of each device. The I/O monitoring information indicates the amount of data which is inputted or outputted per unit time, while the CPU monitoring information typically indicates statistic data about the CPU operating rate of each device. The management server 1000 can estimate loads on the I/O and CPU of a device which executes a job by monitoring the I/O and CPU monitoring information of each device.

The fault manager 1002 can retrieve jobs 6010 which are affected by a failed location from the relationship between each of the jobs 6010 and each of the devices by monitoring the monitoring information of the respective devices and the information stored in the management server management table 2011 managed by the management server 1000. The fault manager 1002 can rely on the result of the retrieval to selectively perform a flexible execution control using the priorities of the jobs 6010 or the previously determined execution control. In this way, the fault manager 1002 can readily ascertain the influence exerted by a fault, clarify jobs 6010 affected by the fault, and perform the job execution control specified by the human manager.

Assume that the fault manager 1002 can calculate an estimate for a job execution time based on the I/O and CPU monitoring information. Assume also that the fault manager 1002 can know a job execution time before a fault. With a routine job, it is easy to utilize general statistic data about job execution times. The fault manager 1002 determines whether or not the estimated job execution time exceeds the job execution time before the fault occurs (step 25042).

When the fault manager 1002 determines at step 25042 that the estimated job execution time exceeds the job execution time before the fault, the execution of the job may continue beyond a scheduled end time. In this event, the fault manager 1002 references the priority column 24040 of this job in the job execution control table 24000 and compares the priority of the job with the standard priority value "3" given to a normal job (step 25043). When the priority of the job is lower than "3" which is the standard priority value given to a normal job at step 25043, the fault manager 1002 saves the state of the currently executed processing in the storage device, and executes the job execution control in accordance with the contents in the processing content column 24060 of the job execution control table (step 25044). Conversely, when the priority of the job is equal to or higher than "3" which is the standard priority value given to a normal job, the flow proceeds to step 25050 without performing the job execution control. On the other hand, when the fault manager 1002 determines at step 25042 that the estimated job execution time does not exceed the job execution time before the fault, the flow proceeds to step 25050 without performing the job execution control.

Next, when the failed device is recovered from the fault, the failed device transmits a Trap message which has a fault code indicative of the recovery to the management server 1000. Upon receipt of the Trap message, the management server 1000 searches the event dictionary 2012 for the fault code within the message, and extracts the identifier 15030 of the recovered location and the fault management ID 15040.

Upon recovery from the fault, the fault manager 1002 returns to the processing, which had been executed before the job execution control was started, from the job execution control under execution, using the extraction result 20000 at step 19030 and the saved processing state (step 25050). For this purpose, the fault manager 1002 searches the extraction result 2000 using keys which are the extracted identifier 15030 and fault management ID 15040 to retrieve the job ID 20120 in the DBMS server column 20100. The management server 1000 instructs the associated device, through the fault manager 1002, to return from the job execution control indicated by the fault management ID 20050 to the processing which had been executed for the job ID 20120 before the job execution control was started (step 25050). Next, the management server 1000 creates a message indicating that the failed device has been recovered from the fault for notifying the human manager to that effect (step 25060).

In the foregoing embodiment, the fault manager 1002 saves the state of the currently executed processing in the execution assigned device specified in the job execution control table 24000, and executes the job execution control specified in the job execution control table. In this event, the state of the currently executed processing may be saved in any device.

The following description will be made in connection with an example in which the physical disk 1032 "SS1" fails in the storage device 1030, followed by the job execution control which entails a closing operation through the consistent processing method which has been previously determined. In this event, the storage device 1030 transmits to the management server 1000 a fault notice message indicating that the physical disk 1032 "SS1" has failed in the storage device 1030. The management server 1000 identifies the failed location in a manner similar to the first embodiment.

When the fault manager 1002 of the management server 1000 receives the message at step 25000, the fault manager 1002 acquires the extraction result 2000 shown in FIG. 20 from the fault code 16109 in the message by referencing the event dictionary 2012 and management server management table 2011. After receiving a permission of executing the job execution control from the human manager at step 25030, the fault manager 1002 saves the state of the currently executed processing in the execution assigned device 24030 which is set in accordance with instructions in the job execution control table 24000, and executes the processing contents 24060 assigned by the specified processing method 24050 from step 25040 to step 25041.

When the failed physical disk 1032 is recovered from the fault in the storage device 1030, the storage device 1030 recovered from the fault transmits a Trap message including a fault recovery code "00a1" to the management server 1000 at step 25050. Upon receipt of this message, the fault manager 1002 extracts the identifier "SS1" and fault management ID "F3031" on the row 15101 from the event dictionary 2012 using a key which is the fault recovery code "00a1" in the message, and returns from the job execution control 15101 which is given the identifier "SS1" and managed by the fault management ID "F3031" in the table 2000 of FIG. 20 created upon occurrence of the fault, to the processing which had been executed before the job execution control was started, and the state of which is saved. The management server 1000 displays a message to the human manager at step 25060, indicating that the storage device 1030 has been recovered from the fault, and that the saved processing is resumed instead of the job execution control.

Figure 26:
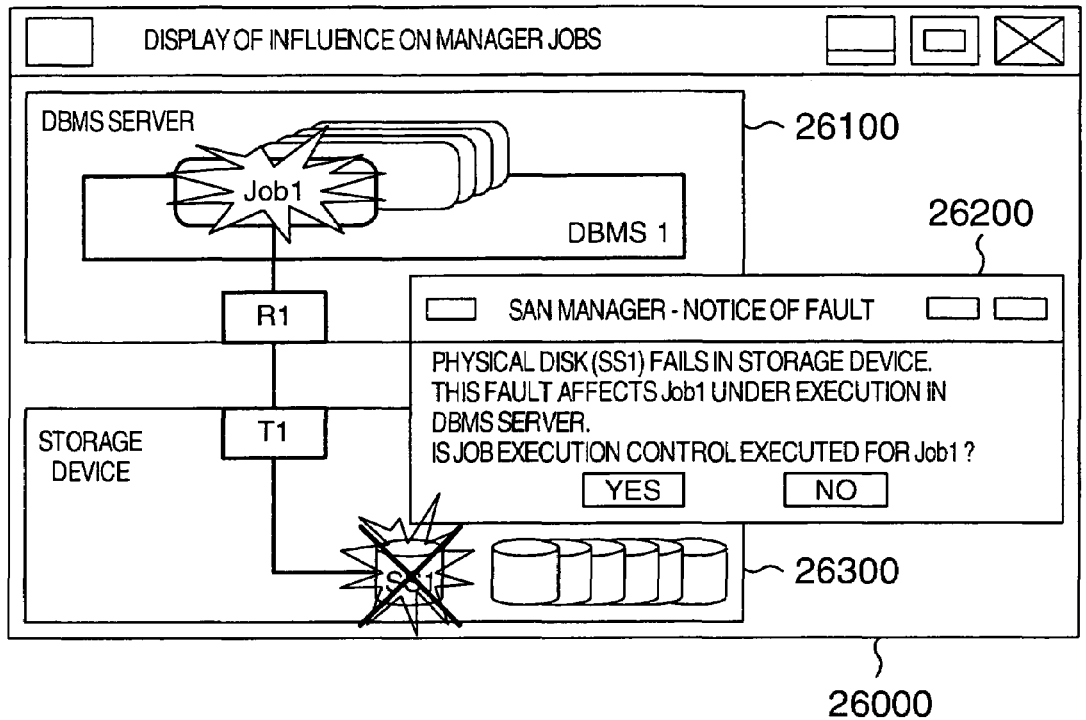
FIG. 26 is a diagram illustrating an exemplary notice for requesting the human manager to confirm the execution of the job execution control for a job identified by ID "Job1" which is affected by a fault in the storage device.

FIG. 26 illustrates an exemplary notice 26000 for requesting the human manager to confirm the execution of the job execution control for a job 6010 "Job1" which is affected by the failed physical disk 1032 "SS1" in the storage device 1030. Since the human manager is notified of the location at which the fault has occurred, the affected job, DBMS server 1010, and the like which are displayed together on a single screen, the human manager can readily know the influence of the fault to the respective jobs 6010. In this event, the fault manager 1002 provides the human manager with detailed and readily understandable information for performing the job execution control. While the exemplary notice 26000 shows that a fault occurs at one location, a similar display is provided as well when faults occur at a plurality of locations.

Figure 27:
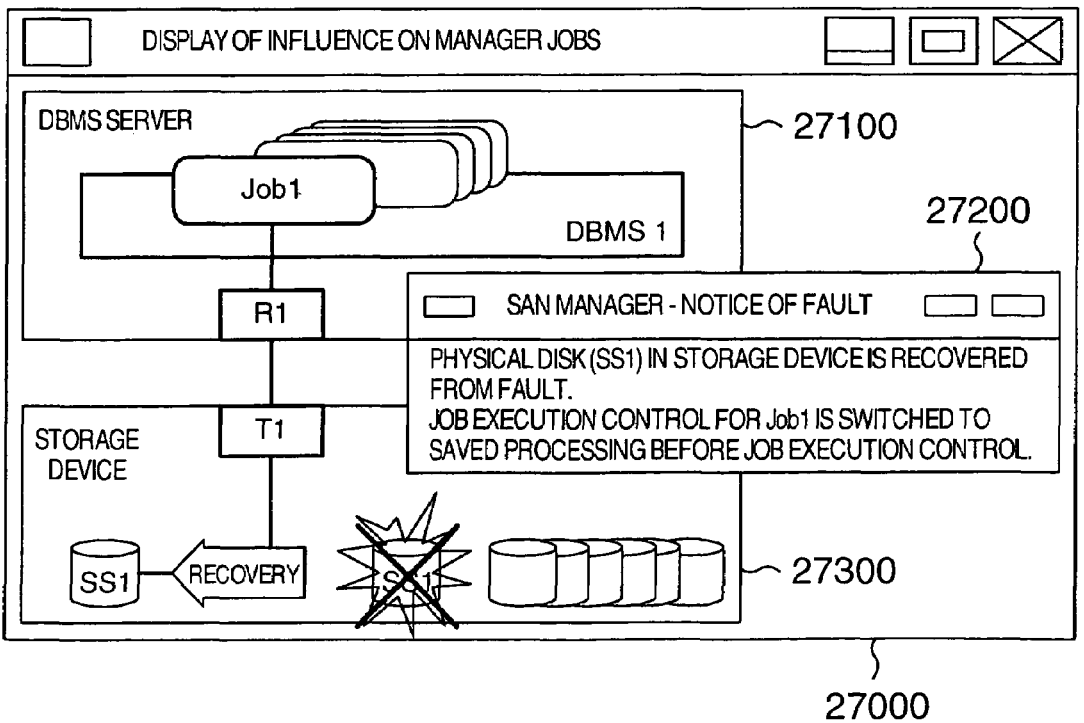
FIG. 27 is a diagram illustrating an exemplary notice which is given to the human manager for indicating that a physical disk identified by ID "SS1" has been recovered from the fault in the storage device.

FIG. 27 illustrates another exemplary notice 27000 which is given from the management server 1000 to the human manager, indicating that the physical disk 1032 "SS1" has been recovered from the fault in the storage device 1030.

By selectively performing a specified execution control, a priority-based execution control, or scheduling on a job-by-job basis to address a detected fault, as shown in the foregoing embodiment, the resulting system can be efficiently operated in spite of degraded performance of the system due to the fault.

While the foregoing first and second embodiments described above have been implemented in a supposed network configuration in which a virtualization switch device has a virtualization function, the first and second embodiments can be implemented in a similar way in a network configuration in which a device different from that having a switch function is connected to a management network and SAN as a virtualization device.

As will be appreciated from the foregoing, the fault management techniques according to the present invention can integrate data mapping information on a job-by-job basis, identify a job which is affected by a fault based on the data mapping information, and control the execution of the job which is affected by the fault.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A server computer for identifying a job which is affected by a fault at a location existing on a data mapping path in a computer system having a computing device for executing jobs and a storage device including physical disk units, said data mapping path comprising a particular database table accessed by a particular job, a file for storing said particular database table, a logical disk unit for storing said file, and said physical disk units for distributively storing data on said logical disk unit, based on data mapping information related to said data mapping path, said data mapping information including an identifier of an interface situated on said data mapping path for interfacing one device to another, said server computer comprising:

collection means for collecting part of said data mapping information from each of the devices which hold corresponding information on said data mapping path from said job to said physical disk units through said particular database table, said file, and said logical disk unit;

integration means for integrating said data mapping information on a job-by-job basis for storage in a management information table; and identifying means for identifying a job affected by a fault with reference to said management information table for displaying the affected job upon receipt of a fault report about any of said physical disk units from said storage device.

2. The server computer according to claim 1, wherein:

said data mapping information has a hierarchical structure comprised of a real volume for storing said file, one or more virtual volumes for storing said real volume, a plurality of said logical disk units for distributively storing data on said virtual volume, and said physical disk units for distributively storing data on said logical disk units; and said computer system further comprises a virtualizer interposed between said computing device and said storage device for converting an identifier of said virtual volume included in an input/output request received from a higher rank device to an identifier of said logical disk unit.

3. The server computer according to claim 2, wherein said data mapping information includes information on a correspondence relationship between said file and said real volume, information on a correspondence relationship between said real volume and said virtual volume, information on a correspondence relationship between said virtual volume and said logical disk units, and information on a correspondence relationship between said logical disk units and said physical disk units.

4. The server computer for identifying a job which is affected by a fault at a location existing on a data mapping path, in a computer system having a computing device for executing jobs and a storage device including physical disk units, said data mapping path comprising a particular database table accessed by a particular job, a file for storing said particular database table, a logical disk unit for storing said file, and said physical disk units for distributively storing data on said logical disk unit, based on data mapping information related to said data mapping path, said data mapping information including correspondence relationships between identifiers for said job, said table, said file, said logical disk unit, and said physical disk units, and an identifier of an interface situated on said data mapping path for interfacing one device to another, said server computer comprising:

collection means for collecting part of said data mapping information from each of devices which hold the part of said data mapping information;

integration means for integrating said data mapping information on a job-by-job basis for storage in a management information table; and identifying means for identifying a job affected by a fault with reference to said management information table for displaying the affected job upon receipt of a fault report about a location existing on said data mapping path, said location having an identifier stored in said management information table.

5. The server computer according to claim 4, wherein:

said data mapping information includes information on a correspondence relationship between said file and a real volume for storing said file, information on a correspondence relationship between said real volume and one or more virtual volumes for storing said real volume, information on a correspondence relationship between said virtual volumes and a plurality of said logical disk units for distributively storing data on said virtual volumes, and information on a correspondence relationship between said logical disk units and said physical disk units for distributively storing data on said logical disk units; and said computer system further comprises a virtualizer interposed between said computing device and said storage device for converting an identifier of said virtual volume included in an input/output request received from a higher rank device to an identifier of said logical disk unit.

6. The server computer according to claim 4, further comprising means for processing said job identified to be affected by the fault by a processing method previously set in a job execution control table.

7. The server computer according to claim 6, further comprising means, responsive to information set in said job execution control table as to whether or not a human manager is requested to confirm the processing, for processing said job identified to be affected by the fault by said processing method when the human manager gives a permission.

* * * * *